US012146825B1

(12) United States Patent
Ahmad et al.

(10) Patent No.: US 12,146,825 B1
(45) Date of Patent: Nov. 19, 2024

(54) SYSTEM AND METHODS FOR ASSESSMENT OF SCALE DEPOSITS IN PIPELINES

(71) Applicant: KING FAHD UNIVERSITY OF PETROLEUM AND MINERALS, Dhahran (SA)

(72) Inventors: Aftab Ahmad, Dhahran (SA); Syed M. Shaahid, Dhahran (SA); Luai M. Alhems, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 0 days.

(21) Appl. No.: 18/752,161

(22) Filed: Jun. 24, 2024

(51) Int. Cl.
*G01N 17/00* (2006.01)
*C02F 5/00* (2023.01)
*G01F 1/74* (2006.01)
*G05D 11/13* (2006.01)

(52) U.S. Cl.
CPC ............ *G01N 17/008* (2013.01); *C02F 5/00* (2013.01); *G01F 1/74* (2013.01); *G05D 11/13* (2013.01); *C02F 2303/22* (2013.01)

(58) Field of Classification Search
None
See application file for complete search history.

(56) References Cited

U.S. PATENT DOCUMENTS

| 2023/0286835 | A * | 2/1994 | Aljundi | C02F 1/043 |
| 2003/0071988 | A1 | 4/2003 | Smith et al. | |
| 2010/0300684 | A1 | 12/2010 | Kotsonis et al. | |
| 2015/0316402 | A1 | 11/2015 | Wee et al. | |
| 2017/0050873 | A1 * | 2/2017 | Sakai | C08F 120/06 |
| 2019/0002304 | A1 * | 1/2019 | Piironen | G01N 17/008 |
| 2021/0123865 | A1 * | 4/2021 | Xiong | G01N 21/6486 |
| 2023/0056272 | A1 * | 2/2023 | Zuidervaart | C02F 1/42 |

FOREIGN PATENT DOCUMENTS

| CA | 2122081 A1 * | 10/1994 | G05D 7/06 |
| CN | 116297134 A | 6/2023 | |
| EP | 0622630 A2 * | 2/1994 | G01N 33/18 |

(Continued)

OTHER PUBLICATIONS

Alhems et al., "Comparative Thermal Evaluation of Two Systems of Wall Panels Exposed to Hot and Arid Arabian Environmental Weather Conditions", 2024, Alhems et al. Int J Concr Struct Mater (2024) 18:35. (Year: 2024).*

(Continued)

*Primary Examiner* — Mohammad Ali
*Assistant Examiner* — Kelvin Booker
(74) *Attorney, Agent, or Firm* — Oblon, McClelland, Maier & Neustadt, L.L.P.

(57) ABSTRACT

A scale assessment system and a method for performing a scale deposit assessment that includes a scale solution flow loop. The scale assessment system also includes an insulated temperature controlled scale solution holding tank, a scale deposit assessment flow loop, a scale inhibitor flow loop, and/or a measurement and control unit configured to determine one or more of an amount of scale deposit in a plurality of connected U-shaped test pipes and an amount of scale inhibitor required to prevent scale deposit in the plurality of connected U-shaped test pipes.

16 Claims, 11 Drawing Sheets

(56) References Cited

FOREIGN PATENT DOCUMENTS

| GB | 2402738 B | 12/2004 | | |
|---|---|---|---|---|
| WO | WO-2012047821 A2 | * | 4/2012 | ............. G01N 33/00 |
| WO | WO-2023170702 A1 | * | 9/2023 | ............. C02F 5/083 |

OTHER PUBLICATIONS

Shaadid et al., "Experimental Study of Two-Phase Air-Water Flow Behavior at Different Intake Flow Conditions of an Electric Submersible Pump", 2023, 2023 14th International Conference on Mechanical and Intelligent Manufacturing Technologies. (Year: 2023).*

Shi et al., "Optimization for Pipeline Corrosion Sensor Placement in Oil-Water Two-Phase Flow Using CFD Simulations and Genetic Algorithm", Jul. 2023, Sensors 2023, 23, 7379. (Year: 2023).*

Zakharchenko, "Development of a Holistic Model of the Carleton Supercritical Water Loop (SCWL)", Nov. 2012, Department of Mechanical and Aerospace Engineering Carleton University, Ottawa, Ontario, Canada. (Year: 2012).*

Rostron ; Critical Review of Pipeline Scale Measurement Technologies ; Indian Journal of Science and Technology, vol. 11(17) ; May 2018 ; 19 Pages.

Rochester Sensors ; Guided Wave Radar II ; 1 Page, submitted Jun. 2024.

Rochester Sensors ; Continuous Level (4-20ma) Configurator—Build to Order ; 1 Page, Nov. 2023.

Watts ; Pressure Sensor ; 2023 ; 2 Pages.

Phase IV Engineering ; Wireless Differential Pressure Transceiver Node ; Jun. 2023 ; 2 Pages.

Watts ; FloPro-MD Standard ; 2 Pages, submitted Jun. 2024.

Watts ; 930GS ; 2 Pages, submitted Jun. 2024.

Watts ; Aquatech Pumps ; 2 Pages, submitted Jun. 2024.

Watts ; 71 Class 125 Cast iron Sure Check Valves, submitted Jun. 2024.

Watts ; 405-NRS-RW ; 1 Page, submitted Jun. 2024.

Silverson ; Silverson Mixer Homogenizers ; https://www.siiverson.com/us/homogenizers/ ; 2 Pages, submitted Jun. 2024.

* cited by examiner

SYSTEM AND METHODS FOR ASSESSMENT OF SCALE DEPOSITS IN PIPELINES

CROSS REFERENCE TO RELATED APPLICATION

The present disclosure claims the benefit of Saudi patent application Ser. No. 10/202,43366 filed on Jun. 12, 2024, with the Saudi Authority for Intellectual Property Office, which is incorporated herein by reference in its entirety.

BACKGROUND

Technical Field

The present disclosure is directed to a scale assessment system and a method for performing a scale deposit assessment, particularly for evaluating and controlling scale deposits in pipelines, such as in oil and gas production facilities.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In the oil and gas industry, the development and maintenance of field operations are heavily impacted by the presence of scale deposits within pipelines and other operational equipment. These deposits are primarily formed by feedwater contaminants such as calcium, magnesium, iron, silica, and aluminum. The issue arises from the solubility characteristics of certain salts present in the feedwater, which, while not completely insoluble, have limited solubility and thus tend to precipitate out of solution under certain conditions. Scale formation is a physicochemical process that occurs when these partially soluble salts are carried by the feedwater and reach supersaturation. This supersaturation often occurs due to changes in temperature, pressure, or water chemistry, such as pH adjustments. As a result, these salts crystallize and deposit along the surfaces of pipelines and equipment, leading to the formation of scale. The types of scales encountered in the oil and gas industry can generally be classified into two main categories: carbonate scales, which are sensitive to changes in pH, and sulfate scales, which are not pH-dependent. The conditions that favor scale formation include high salt concentrations, elevated operating temperatures, increased fluid velocity, and high-pressure environments typical of oil and gas extraction and processing operations. These factors collectively or individually contribute to the likelihood of scale deposits forming, complicating the extraction and processing of oil and gas by reducing equipment efficiency and increasing maintenance requirements.

Accumulation of scale restricts the internal diameter of pipes, reduces fluid flow, increases pressure, and can lead to complete blockages. These effects may lead to frequent shutdowns for cleaning and maintenance, disrupted production and increased operational expenses. Moreover, scale deposits may cause physical damage to the infrastructure, including corrosion under scale (CUS), which worsens the degradation of pipeline materials and may lead to leaks or pipeline failures. Such failures are costly in terms of repairs and replacements, and also pose significant environmental and safety risks. Additionally, the presence of scale affects the efficiency of heat exchangers, pumps, and valves, reducing the overall operational efficiency. Cleaning and removing these scale deposits is a time-consuming and costly process that often involves the use of harsh chemicals or mechanical methods, which can damage the equipment and are not always effective against all types of scale.

Traditionally, the industry has employed various methods to manage scale deposits, including mechanical scraping, chemical dissolution using acids, and the use of scale inhibitors injected directly into the pipelines. Scale inhibitors, specifically, are chemicals designed to prevent the precipitation of scale-forming minerals by interfering with crystal growth. These methods aim to either prevent the formation of scale or remove it once formed. While conventional methods such as chemical treatments and mechanical removal are somewhat effective, they have significant limitations. Chemical treatments can lead to environmental concerns and may not be effective against all types of scale. Mechanical methods are invasive and can damage the pipeline integrity over time. Furthermore, these solutions often do not provide real-time monitoring or proactive management of scale formation, instead relying on reactive approaches that only address scale once it has already formed.

CN 116297134A describes a pipeline fouling sensitivity testing device, comprising a cation solution storage tank and an anion solution storage tank, the two storage tanks are connected with a liquid mixing device, pressure sensors, a temperature sensor which measures scale in the pipeline, and a computer. A scale inhibitor solution storage tank is connected through the third liquid pipeline with the liquid inlet of the liquid mixing device. The difference in pressure through the test pipeline is measured over time by a scale difference sensor, where increased pressure indicates scale buildup. The cation solution can be mixed solution of calcium chloride and magnesium chloride, anion solution can be selected from sodium carbonate, mixed solution of sodium bicarbonate and sodium sulfate, the proportion relation of each component in the cation solution and anion solution, determined according to the specific experiment requirement. This reference is related to removing scale from existing pipelines and is not a method for testing various scale solutions (formed by mixing of two solutions) storage tank and scale inhibitor solutions in a testing apparatus.

US 20030071988A1 describes ATR probes which can be inserted at two different locations on a pipeline to detect scale build up. Measurements from the probes are sent to a controller. If there is scale build up, the controller adjusts the amount of scale inhibiting additive pumped into the pipeline. This reference addresses detecting the amount of scale in existing pipelines and is not a method for testing various scale solutions (formed by mixing of two solutions) storage tank and scale inhibitor solutions in a testing apparatus.

US 20100300684A1 describes a downhole scale monitoring and inhibition system which may be provided with a measurement module and injection module. The measurement module monitors at least one downhole parameter indicative of the potential for scale formation. In response to data output from the measurement module, the injection module is operated to provide downhole, local injections of an inhibitor chemical. The sensors may be designed to detect actual scale build-up on certain components. Once scale build-up is detected, suitable solvents may be injected locally to remove the established deposits. This methodology also may be combined with the preventive application of inhibitors if desired. Scale dissolvers include sulfate scale dissolvers. A scale monitoring and inhibition system is designed to monitor one or more downhole parameters indicative of possible scale build-up and also to react locally with respect to a specific downhole tool. The local reaction may comprise injecting a scale inhibitor proximate to the downhole tool for reaction with the downhole tool, thereby preventing, limiting and/or removing scale precipitation. This reference does not mention experimenting with mixing scale solutions or scale inhibitors in a testing apparatus.

Each of the aforementioned references suffers from one or more drawbacks hindering their adoption, such as the need to make test holes in existing pipelines. Accordingly, it is one object of the present disclosure to provide a testing apparatus, methods and systems for testing the amount of scale buildup for different scale solution mixtures, the effectiveness of various scale inhibitors in removing or preventing the build-up of the scale. Aspects of the present disclosure are directed to determining the conditions that contribute to scale formation, and operational parameters for reducing the effect of scale-related issues.

SUMMARY

In an exemplary embodiment, a scale assessment system is described. The scale assessment system comprises a scale solution flow loop. The scale assessment system further comprises an insulated temperature controlled scale solution holding tank. The scale assessment system further comprises a scale deposit assessment flow loop. The scale assessment system further comprises a scale inhibitor flow loop. The scale assessment system further comprises a measurement and control unit configured to determine one of an amount of scale deposit in a plurality of connected U-shaped test pipes and an amount of scale inhibitor required to prevent scale deposit in the plurality of connected U-shaped test pipes.

In another exemplary embodiment, a method for performing a scale deposit assessment is described. The method comprises selecting, on a user interface of a programmable logic controller, a scale deposit assessment option including a first option of a scale deposit solution without a scale inhibitor solution and a second option of a scale deposit solution with a scale inhibitor solution. When the first option is selected, the method comprises generating, by the programmable logic controller, a first set of ON/OFF signals which actuate a first variable flow salt solution pump and a second variable flow salt solution pump to pump a first salt solution and a second salt solution through a first piping system respectively at a preset flow ratio to a homogenizer. The method further comprises mixing, by the homogenizer, the first salt solution and the second salt solution to form a scale solution. The method further comprises generating, by the programmable logic controller, a second set of ON/OFF signals which open a solenoid valve to inject the salt solution through a second piping system into an insulated temperature controlled scale solution holding tank. The method further comprises generating, by the programmable logic controller, a third set of ON/OFF signals which actuate a pressure regulator, a tank temperature sensor and a heating element in the insulated temperature controlled scale solution holding tank. The method further comprises generating, by the programmable logic controller, a fourth set of ON/OFF signals which actuate a high-pressure variable flow scale solution pump to pump the scale solution from a scale solution fluid outlet of the insulated temperature controlled scale solution holding tank through a third piping system into a scale deposit assessment flow loop, wherein the scale deposit assessment flow loop includes a plurality of U-shaped test pipes and a plurality of ultrasonic sensors connected to an outer surface of each of the U-shaped test pipes, and a differential pressure sensor operatively connected to measure a pressure difference in a flow rate between an inlet of the plurality of U-shaped test pipes and an outlet of the U-shaped test pipes. The method further comprises receiving, by a microprocessor of a data acquisition system, data signals from a first salt solution flow meter and a second salt solution flow meter of the first piping system, a fluid level sensor and the tank temperature sensor of the insulated temperature controlled scale solution holding tank, a scale solution flow meter, a scale solution temperature sensor, a scale solution pressure sensor, the differential pressure sensor and the ultrasonic sensors of the third piping system. The method further comprises transmitting, by the microprocessor, the data signals of the first salt solution flow meter, the second salt solution flow meter, the scale solution flow meter to a flow controller. The method further comprises transmitting, by the microprocessor, the data signals of the fluid level sensor and the tank temperature sensor of the insulated temperature controlled scale solution holding tank, the scale solution temperature sensor, the scale solution pressure sensor, the differential pressure sensor and the ultrasonic sensors of the third piping system to the programmable logic controller. The method further comprises determining, by the microprocessor, an amount of scale deposited on the U-shaped test pipes from the data signals of the ultrasonic sensors and the data signals of the differential pressure sensor. The method further comprises generating, by the microprocessor, a data assessment of the amount of scale deposited on the U-shaped test pipes due to the preset flow ratio of the first salt solution and the second salt solution. The method further comprises displaying, by the microprocessor, the data assessment, the flow rates of the first salt solution and the second salt solution, a flow rate of the scale solution and a fluid level in the insulated temperature controlled scale solution holding tank on a display screen.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
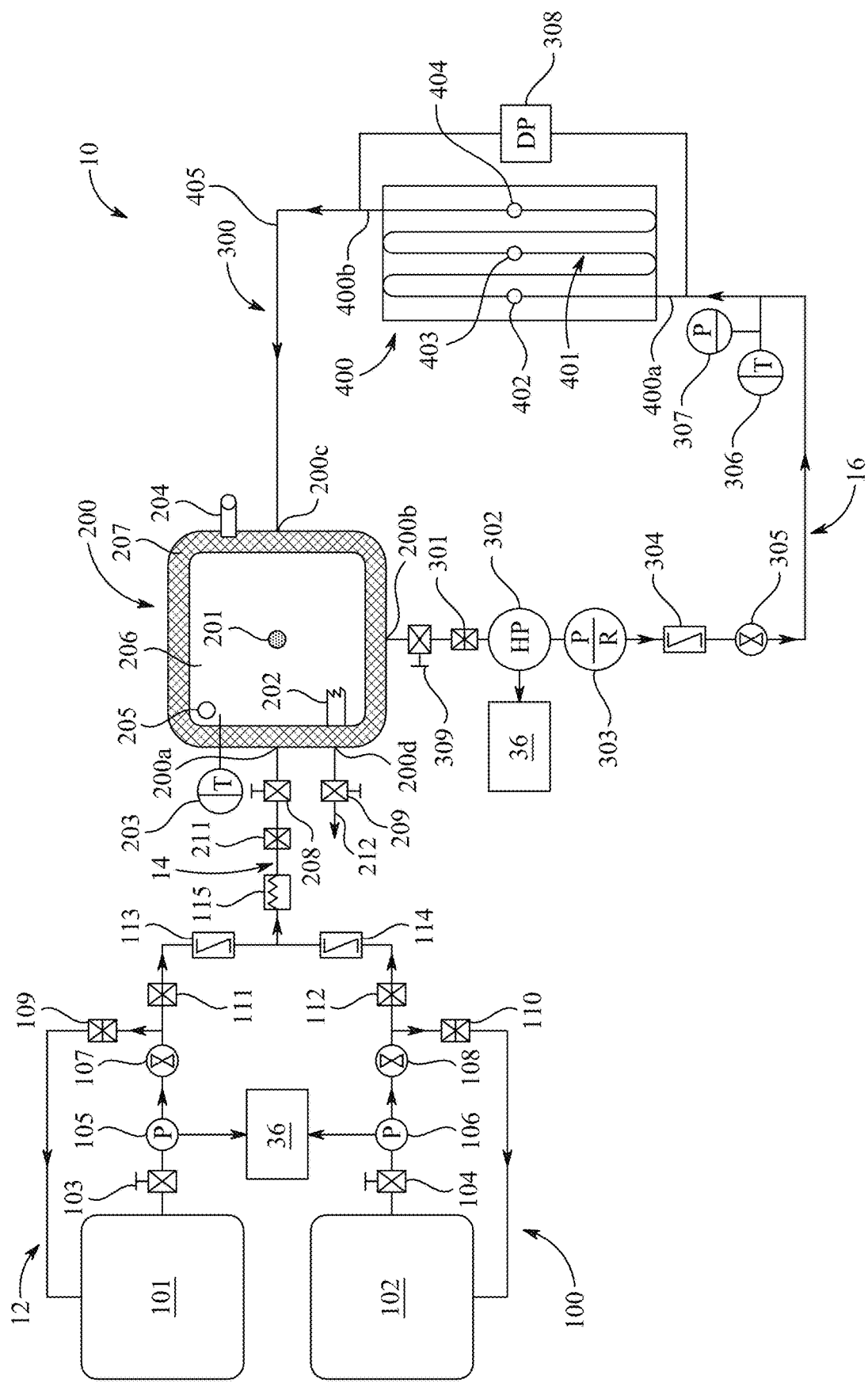
FIG. 1 is a schematic diagram of a scale assessment system for scale deposit assessment without a scale inhibitor solution loop, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a system and a method for assessing scale formation within pipelines. The system and the method of the present disclosure incorporate various loops and sensors to continuously monitor conditions conducive to scale formation and effectively manage the introduction of scale inhibitors. The proposed system and method can be utilized for determination of time taken for formation of scale deposits build-up in the pipeline. This provides for real-time monitoring and management of scale deposition and may help the operation personnel to adopt suitable remedial measures to mitigate the scale issue, potentially reducing downtime and maintenance costs associated with scale build-up. The system and methods of the present disclosure can be used for assessment of different types of scales encountered in oil and gas production. The system and methods of the present disclosure can also be used to study the effect of salt concentration, operating temperature, fluid pressure, fluid velocity, and pH of water environment on pipelines scale deposits.

FIG. 1 illustrates is a schematic of a scale assessment system 10, in accordance with a first aspect of the present disclosure. The scale assessment system 10 includes multiple interconnected components arranged to evaluate scale deposition under various conditions. As illustrated, the scale assessment system 10 includes multiple sub-systems, including a scale solution flow loop 100, an insulated temperature controlled scale solution holding tank 200, a scale deposit assessment flow loop 300, and a test section 400. The scale assessment system 10 also includes multiple piping systems to dispose the said sub-systems in fluid communication with each other, including a first piping system 12 to connect the scale solution flow loop 100 and the insulated temperature controlled scale solution holding tank 200, a second piping system 14 to connect the insulated temperature controlled scale solution holding tank 200 and the scale deposit assessment flow loop 300, and a third piping system 16 to connect the scale deposit assessment flow loop 300 to the test section 400. The scale assessment system 10 is configured for assessment of different types of scales encountered in oil and gas production. The scale assessment system 10 is also configured for studying the effect of salt concentration, operating temperature, fluid pressure, fluid velocity (or flow), and pH of water environment on pipelines scale deposits, which can help optimize pipeline maintenance and operation in the oil and gas industry.

In the scale assessment system 10, the scale solution flow loop 100 includes two primary salt solution tanks, which provide the required chemicals for scale formation simulations. As shown, the scale solution flow loop 100 includes a first salt solution tank 101 and a second salt solution tank 102. The first and second solution tanks 101, 102 store the reactive components that could be combined to form the scale deposits in controlled testing scenarios. In an example, the first salt solution tank 101 is configured to hold a mixture of calcium chloride ($CaCl_2$)) and water, providing $Ca^{2+}$ ions, and the second salt solution tank 102 is configured to hold a mixture of sodium sulfate ($Na_2SO_4$) and water, providing $SO_4^{2-}$ ions. The scale solution flow loop 100 is designed to prepare a scale solution with a known concentration. In the present example, the scale solution comprises calcium sulfate ($CaSO_4$ solution) formed by mixing the calcium chloride solution and the sodium sulfate solution.

The first piping system 12, associated with the scale solution flow loop 100, includes separate flow paths for each solution to ensure controlled delivery and mixing. The first piping system 12 has a first flow path connected to the first salt solution tank 101. As shown, the first flow path includes a first variable flow salt solution pump 105 and a first salt solution flow meter 107. The first variable flow salt solution pump 105 ensures that the first solution is delivered at a regulated, variable rate, accommodating different testing requirements and conditions, while the first salt solution flow meter 107 controls volume of the first solution passing through the first flow path of the first piping system 12. This configuration provides for precise control and measurement of the first solution (calcium chloride). The first piping system 12 also has a second flow path connected to the second salt solution tank 102. As shown, the second flow path includes a second variable flow salt solution pump 106 and a second salt solution flow meter 108, facilitating the same level of control and measurement for the second solution (sodium sulfate) as required for maintaining the desired chemical balance in the scale solution.

Additionally, the first piping system 12 further includes a range of valves configured to optimize and secure the flow of solutions from the scale solution flow loop 100. As shown, the first piping system 12 includes a plurality of solenoid valves 109, 110, 111, 112, a plurality of one-way valves 113, 114 and a plurality of gate valves 103, 104. The plurality of solenoid valves 109-112 are configured to be electrically actuated by a measurement and control unit 600 (as discussed later in the description) to control the flow of the first and second solutions from the scale solution flow loop 100. Specifically, the solenoid valves 111, 112 are configured to control the forward flow of the solutions to the insulated temperature controlled scale solution holding tank 200, and the solenoid valves 109, 110 are configured to prevent backward flow of the solutions to the first and second solution tanks 101, 102. The one-way valves 113, 114 ensure that the flow of the first and second solutions is unidirectional, preventing any backflow that could disrupt the mixing ratios. The plurality of gate valves 103, 104 are configured to provide manual control over the flow of the first and second solutions, providing for isolation of different sections of the scale solution flow loop 100 during any operational adjustments or the like.

In a non-limiting example, the gate valves may be 405-NRS-RW flanged gate values manufactured by Watts Water Technologies Inc., North Andover, Massachusetts, U.S.A.

In another non-limiting solution, the solenoid valves may be 930GS Stainless Steel Solenoid Control Valves manufactured by Watts Water Technologies Inc., North Andover, Massachusetts, U.S.A.

In a non-limiting example, the check valves may be 71 Class 125 One-Way Valves manufactured by Watts Water Technologies Inc., North Andover, Massachusetts, U.S.A.

In a non-limiting example, the first variable flow salt solution pump 105 and the second variable flow salt solution pump 106 are F5853-GB12-V81D Variable Speed Pumps manufactured by Watts Water Technologies Inc., North Andover, Massachusetts, U.S.A.

In a non-limiting example, each flow meter is a FloPro-MD flow meter manufactured by Watts Water Technologies Inc., North Andover, Massachusetts, U.S.A.

Further, as shown, a homogenizer 115 is connected to the first piping system 12. The homogenizer 115 is positioned at a juncture where the two solutions from the separate flow paths meet. The homogenizer 115 is configured to receive the first salt solution and the second salt solution and mix the first salt solution and the second salt solution to form the scale solution. In the present example, the homogenizer 115 is specifically configured to receive both the calcium chloride solution from the first flow path and the sodium sulfate solution from the second flow path, and thoroughly mix these two solutions to form a homogeneous scale solution comprising calcium sulfate, which is used for simulating the scale formation in an operational environment by the scale assessment system 10. In a non-limiting example, the homogenizer may be a Silverson Mixer Homogenizer manufactured by Silverson Machines, Incorporated, East Longmeadow, Massachusetts, U.S.A.

The scale solution flow loop 100 of the scale assessment system 10 is used to prepare the scale solution (for example, $CaSO_4$) of known concentration and vary the ratio of $Ca^{2+}$ and $SO_4^{2-}$ ions using the variable flow salt solution pumps 105, 106. The scale solution flow loop 100 consists of the first ($CaCl_2$)) and second ($Na_2SO_4$) salt solution tanks 101, 102 containing $Ca^{2+}$ and $SO_4^{2-}$ ions, respectively; the variable flow salt solution pumps 105, 106; the salt solution flow meters 107, 108; the gate valves 103, 104; the solenoid valves 109-112, the one-way valves 113, 114 and the homogenizer 115. These components are connected through the first piping system 12. The $Ca^{2+}$ and $SO_4^{2-}$ ions solutions can be prepared by using the calcium chloride and sodium sulfate salts, respectively, of the same concentration as low as 5 ppm. The first and second salt solution tanks 101, 102 are each filled with known concentration and a same quantity of $Ca^{2+}$ and $SO_4^{2-}$ ions solutions, respectively. Depending on the ratio of $Ca^{2+}$ and $SO_4^{2-}$ ions the variable flow salt solution pumps 105 and 106 are operated by the measurement and control unit 600. The $Ca^{2+}$ and $SO_4^{2-}$ ions solutions are mixed in the homogenizer 115 to form the scale solution ($CaSO_4$) and the scale solution is then passed to be stored in the insulated temperature-controlled scale solution holding tank 200. The example of $CaSO_4$ as the scale solution is not limiting and is used to represent the mixing and use of the scale solution. Scale solutions for testing are not limited to calcium sulfate, $CaSO_4$, and may include other scale forming solution such as calcium carbonate, made by mixing solutions of calcium chloride ($CaCl_2$) and sodium carbonate $Na_2CO_3$, for example. Calcium phosphate, calcium sulfate, calcium oxalate, barium sulfate, magnesium hydroxide, magnesium oxide, aluminum oxy-hydroxides, aluminosilicate, barium sulfate mixed with calcium sulfate, halite and silica grains and the like may also be tested to determine the amount of scale build-up and then test scale inhibitors which are effective in preventing or removing scale build-up.

Figure 3:
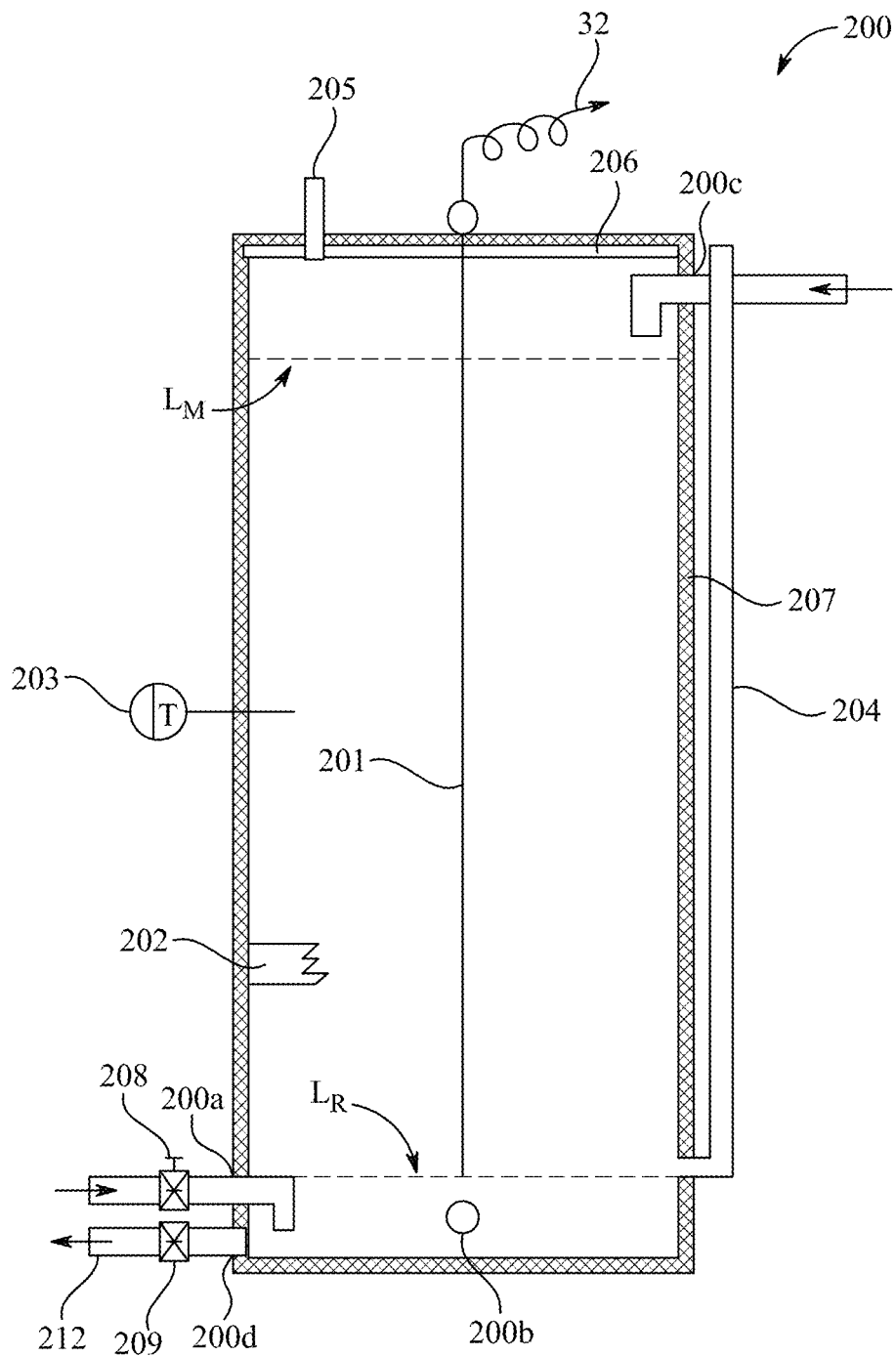
FIG. 3 is a schematic diagram of an insulated temperature controlled scale solution holding tank of the scale assessment system, according to certain embodiments.

In the scale assessment system 10, the insulated temperature controlled scale solution holding tank 200 is designed to maintain the scale solution at specified conditions for precise scale formation testing. FIG. 3 illustrates a detailed schematic of the insulated temperature controlled scale solution holding tank 200. Referring to FIGS. 1 and 3 in combination, the insulated temperature controlled scale solution holding tank 200 includes a scale solution fluid inlet 200a, a scale solution fluid outlet 200b, a return fluid inlet 200c, and a drain outlet 200d. The insulated temperature controlled scale solution holding tank 200 further incorporates the second piping system 14 for the controlled movement of the scale solution from the homogenizer 115. As shown, the scale solution fluid inlet 200a is disposed in fluid communication with the second piping system 14, to receive the scale solution mixture.

Further, as shown, the second piping system 14 includes a gate valve 208 and a solenoid valve 211 connected between the homogenizer 115 and the scale solution fluid inlet 200a. The gate valve 208 is configured for controlling the flow of the scale solution into the insulated temperature controlled scale solution holding tank 200 from the homogenizer 115. The gate valve 208 can be opened or closed to start or stop the flow, providing for management of scale solution based on testing requirements. Additionally, the solenoid valve 211 can be electronically controlled and works in conjunction with the gate valve 208 to regulate the flow of the scale solution. The solenoid valve 211 provides an additional layer of control, capable of quickly shutting off or facilitating flow based on automated signals from the measurement and control unit 600, ensuring that the correct volume of the scale solution is maintained within the insulated temperature controlled scale solution holding tank 200.

The insulated temperature controlled scale solution holding tank 200 also includes a fluid level sensor 201 to measure the level of the scale solution stored therein. The insulated temperature controlled scale solution holding tank 200 further includes a heating element 202 to maintain a desired temperature of the scale solution therein. The insulated temperature controlled scale solution holding tank 200 further includes a tank temperature sensor 203 installed inside thereof, to monitor a temperature of the scale solution. The insulated temperature controlled scale solution holding tank 200 further includes a fluid level sighting glass 204 to facilitate an operator to visually inspect the level of the scale solution stored therein. The insulated temperature controlled scale solution holding tank 200 further includes an air vent 205 to release any trapped gas or air therethrough. The insulated temperature controlled scale solution holding tank 200 further includes a removable lid 206 to provide access for maintenance and cleaning purposes. The insulated temperature controlled scale solution holding tank 200 further includes a thermal insulation 207 to prevent heat loss and maintain a constant temperature of the scale solution therein.

In a non-limiting example, the thermal insulation may be a polyurethane foam, a cellular rubber, fiberglass wool, polyisocyanurate insulation, mineral wool, and the like, layered on the inside of the tank.

In a non-limiting example, the fluid level sensor 201 is a Rochester Continuous Liquid level (4-20 ma) Configurator, manufactured by Rochester Sensors, Coppell, Texas, U.S.A.

The scale solution fluid outlet 200b facilitates the movement of the scale solution from the insulated temperature controlled scale solution holding tank 200 to the scale deposit assessment flow loop 300, where the actual testing for scale deposition takes place. The return fluid inlet 200c is used to reintroduce scale the solution back into the insulated temperature controlled scale solution holding tank 200 from the scale deposit assessment flow loop 300, facilitating recirculation and continuous testing. The insulated temperature controlled scale solution holding tank 200 further includes a drain pipe 212 connected to the drain outlet 200d, and is used to direct excess scale solution to be drained to a drain tank (not shown), or a designated disposal or storage area. A drain gate valve 209 is provided on the drain pipe 212 to control volume of the scale solution to be drained from the insulated temperature controlled scale solution holding tank 200.

In the scale assessment system 10, the scale deposit assessment flow loop 300 is a closed loop. As illustrated in FIG. 1, the scale deposit assessment flow loop 300 incorporates the third piping system 16 to facilitate the assessment of scale formation under controlled conditions. The scale deposit assessment flow loop 300 is specifically configured to simulate real pipeline conditions and measure the effects of scale deposits within a test section 400. In the present example, the scale deposit assessment flow loop 300 is used to assess the calcium sulfate deposits in pipelines of the test section 400 by circulating the calcium sulfate solution, stored in the insulated temperature controlled scale solution holding tank 200, at the desired temperature and pressure, concentration, $Ca^{2+}/SO_4^{2-}$ ratio, and velocity for a defined period of time.

As shown, the third piping system 16 includes a gate valve 309 connected to the scale solution fluid outlet 200b of the insulated temperature controlled scale solution holding tank 200. The gate valve 309 regulates the release of scale solution into the scale deposit assessment flow loop 300, providing control to the scale assessment process. The third piping system 16 also includes a solenoid valve 301 connected to the gate valve 309. The solenoid valve 301 is positioned downstream of the gate valve 309. The solenoid valve 301 is an electronically controlled valve, which further regulates the flow of scale solution, facilitating precise control over the amount of the scale solution entering the scale deposit assessment flow loop 300.

The third piping system 16 further includes a high-pressure variable flow scale solution pump 302 connected to the solenoid valve 301. The high-pressure variable flow scale solution pump 302 elevates the pressure of the scale solution to required levels necessary for the testing procedures. The high-pressure variable flow scale solution pump 302 is capable of varying its output to simulate different flow conditions found in actual oil pipelines or the like. The third piping system 16 further includes a pressure regulator 303 connected to the high-pressure variable flow scale solution pump 302. The pressure regulator 303 ensures that the pressure of the scale solution remains within specified limits to maintain consistent testing conditions. The third piping system 16 further includes a one-way valve 304 connected to the pressure regulator 303. The one-way valve 304 prevents the backflow of the scale solution, ensuring that the flow within the scale deposit assessment flow loop 300 remains unidirectional and consistent. The third piping system 16 further includes a scale solution flow meter 305, which measures the rate at which the scale solution flows through the scale deposit assessment flow loop 300, providing data for analyzing the scale formation. The third piping system 16 further includes a scale solution pressure sensor 307 and a scale solution temperature sensor 306 to monitor pressure and temperature of the scale solution within the scale deposit assessment flow loop 300, respectively. These measurements help in ensuring that conditions of the scale solution match those required for accurate scale formation simulation.

In a non-limiting example, the pressure sensor is a Watts ES Pressure Sensor 2304 and the temperature sensor is a Watts 071 Temperature Sensor, both manufactured by Watts Water Technologies Inc., North Andover, Massachusetts, U.S.A.

As mentioned, the scale deposit assessment flow loop 300 simulates the real pipeline conditions and measure the effects of scale deposits within the test section 400. Herein, the scale deposit assessment flow loop 300, specifically the test section 400, includes a plurality of connected U-shaped test pipes 401 connected to the third piping system 16. The plurality of connected U-shaped test pipes 401 include an inlet pipe 400a and an outlet pipe 400b, which facilitate the flow of scale solution through the U-shaped test pipes 401. The U-shaped test pipes 401 are the primary testing sites within the scale assessment system 10, where scale deposits are formed and assessed.

The scale deposit assessment flow loop 300 includes a differential pressure sensor 308 configured to measure a pressure difference in a flow rate of the scale solution between the inlet pipe 400a and the outlet pipe 400b of the plurality of U-shaped test pipes 401. As shown, the differential pressure sensor 308 is disposed on an impulse line connected to the inlet pipe 400a and the outlet pipe 400b at its two ends. The test section 400, of the scale deposit assessment flow loop 300, further includes a plurality of ultrasonic sensors 402, 403, 404 connected to an outer surface of each of the U-shaped test pipes 401. Each ultrasonic sensor 402-404 is configured to measure a thickness of a scale deposit on the interior surface of a respective U-shaped test pipe 401. The high-pressure variable flow scale solution pump 302 operates for a defined period of time until appreciable scale deposits are recorded by the ultrasonic sensor 402-404. Such data provides the dynamics of scale formation, which helps in the scale deposit assessment as per aspects of the present disclosure. Further, as shown, the test section 400, of the scale deposit assessment flow loop 300, further includes a scale solution return path 405 connected to the return fluid inlet 200c. The return fluid inlet 200c provides for the recirculated scale solution to return to the insulated temperature controlled scale solution holding tank 200 via the return fluid inlet 200c, facilitating continuous or repeated testing cycles without the requirement for new solution preparation.

In a non-limiting example, the differential pressure sensor 308 is a phase IV Wireless Differential Pressure Transceiver Node manufactured by Leap Sensors, Boulder, Colorado, U.S.A.

The scale assessment system 10 of FIG. 1 is used to assess the formation of scale deposits, specifically calcium sulfate scale, in the U-shaped test pipes 401 without using any scale inhibitor. The primary purpose of this setup is to understand the progression and characteristics of scale deposit formation under a set of predefined conditions, simulating those encountered in oil and gas pipelines.

Figure 2:
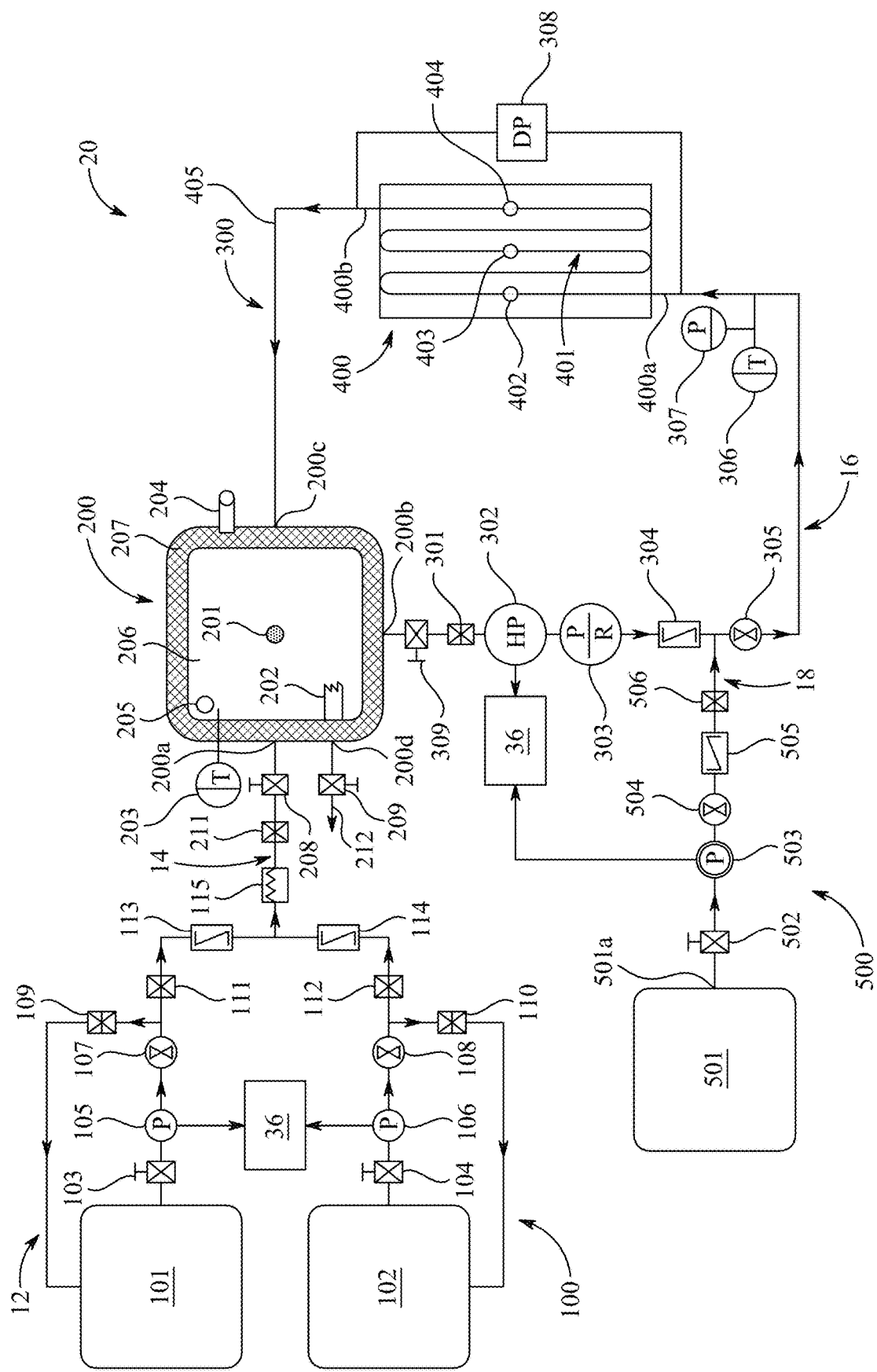
FIG. 2 is a schematic diagram of the scale assessment system for scale deposit assessment with the scale inhibitor solution loop, according to certain embodiments.

FIG. 2 illustrates is a schematic of a scale assessment system 20, in accordance with a second aspect of the present disclosure, that incorporates a scale inhibitor flow loop 500. The scale assessment system 20 provides for the assessment of scale deposits both with and without the use of scale inhibitors. The scale assessment system 20 provides the ability to assess the effectiveness of scale inhibitors in preventing or reducing the formation of scale deposits within the same U-shaped test pipes 401.

Scale inhibitors are specialty chemicals that are added to oil production systems to delay, reduce and/or prevent scale deposition. Acrylic acid polymers, maleic acid polymers and phosphonates have been used extensively for scale treatment in water systems due to their excellent solubility, thermal stability and dosage efficiency. In the water treatment industry, the major classes of SIs have inorganic phosphate, organophosphorous and organic polymer backbones and common examples are PBTC (phosphonobutane-1,2,4-tricarboxylic acid), ATMP (amino-trimethylene phosphonic acid) and HEDP (1-hydroxyethylidene-1,1-diphosphonic acid), polyacrylic acid (PAA), phosphinopolyacrylates (such as PPCA), polymaleic acids (PMA), maleic acid terpolymers (MAT), sulfonic acid copolymers, such as SPOCA (sulfonated phosphonocarboxylic acid), polyvinyl sulfonates. Two common oilfield mineral SIs are Poly-Phosphono Carboxylic acid (PPCA) and Diethylenetri-amine-penta(methylene phosphonic acid) (DTPMP). In a non-limiting example, the scale inhibitor is Nuflow SIC-30, which is designed to prevent sulfate scales including calcium carbonate ($CaCO3$), magnesium carbonate ($MgCO3$), calcium sulfate ($CaSO4$), barium sulfate ($BaSO4$), magnesium sulfate ($MgSO4$) and strontium sulfate ($SrSO4$) scale deposits, manufactured by NuGenTec, Emeryville, California, U.S.A.

As illustrated in FIG. 2, the scale inhibitor flow loop 500 includes a scale inhibitor tank 501 configured to hold a scale inhibitor solution. The scale inhibitor tank 501 serves as the reservoir from which the scale inhibitor is drawn into the scale deposit assessment flow loop 300. The scale inhibitor tank 501 may include a level sensor, a pressure sensor, a temperature sensor similar to those used in the scale solution holding tank 200 and a mixing blade (not shown) configured to ensure the homogeneity of the scale inhibitor. The tank is designed to ensure that the inhibitor is maintained under specified conditions, ready for delivery into the flow loop when required. The specified conditions may include the temperature, the pressure, the concentration as well as homogeneity of the scale inhibitor. The scale assessment system 20 incorporates a fourth piping system 18 for the delivery of the scale inhibitor from the scale inhibitor tank 501 to the scale deposit assessment flow loop 300. As shown, the fourth piping system 18 includes a gate valve 502 connected to an outlet 501a of the scale inhibitor tank 501. The gate valve 502 controls the release of the scale inhibitor solution into the scale deposit assessment flow loop 300. The fourth piping system 18 also includes a fixed rate scale inhibitor pump 503 to deliver the scale inhibitor at a constant rate. The fixed rate ensures that the amount of the scale inhibitor introduced into the scale solution is consistent and controlled, for accurate testing and assessment of its efficacy. The fourth piping system 18 further includes a scale inhibitor flow meter 504 which measures the flow rate of the scale inhibitor being introduced into the scale deposit assessment flow loop 300. The fourth piping system 18 further includes a one-way valve 505 which ensures that the flow of the scale inhibitor is unidirectional, preventing any backflow into the scale inhibitor tank 501. The fourth piping system 18 further includes a solenoid valve 506 connected in series. Herein, the solenoid valve 506 is connected to the third piping system 16. The solenoid valve 506 is electronically controlled by the measurement and control unit 600, to manage the entry of the scale inhibitor into the third piping system 16, which carries the scale solution to the U-shaped test pipes 401. The operation of the solenoid valve 506 can be synchronized with other system operations to ensure that the scale inhibitor is added to the scale solution at the correct time and in the correct quantities.

In the scale assessment system 20, the integration of these components within the scale inhibitor flow loop 500 ensures that the scale inhibitors can be systematically and accurately introduced into the scale deposit assessment flow loop 300. This configuration of the scale assessment system 20 facilitates the effective study of scale inhibitor properties and performance, and enhances its capability to mimic real-world pipeline conditions, where scale inhibitors are often used to manage scale buildup. By providing a means to test the scale inhibitors under controlled yet realistic conditions, the scale assessment system 20 facilitates more effective scale management strategies for the oil and gas industry.

While the foregoing description has been described in terms of the scale assessment system 20, it should be appreciated that the described features, functions, components, and operations may be equally applicable to the scale assessment system 10, as appropriate. The disclosure of particular embodiments of the scale assessment system 20 should not be interpreted as limiting the scope of the present disclosure to only those embodiments. One skilled in the art will recognize that the features and aspects described herein in the context of the scale assessment system 20 may be implemented and applied to the scale assessment system 10 in an appropriate manner without departing from the spirit and scope of the present disclosure.

Figure 4:
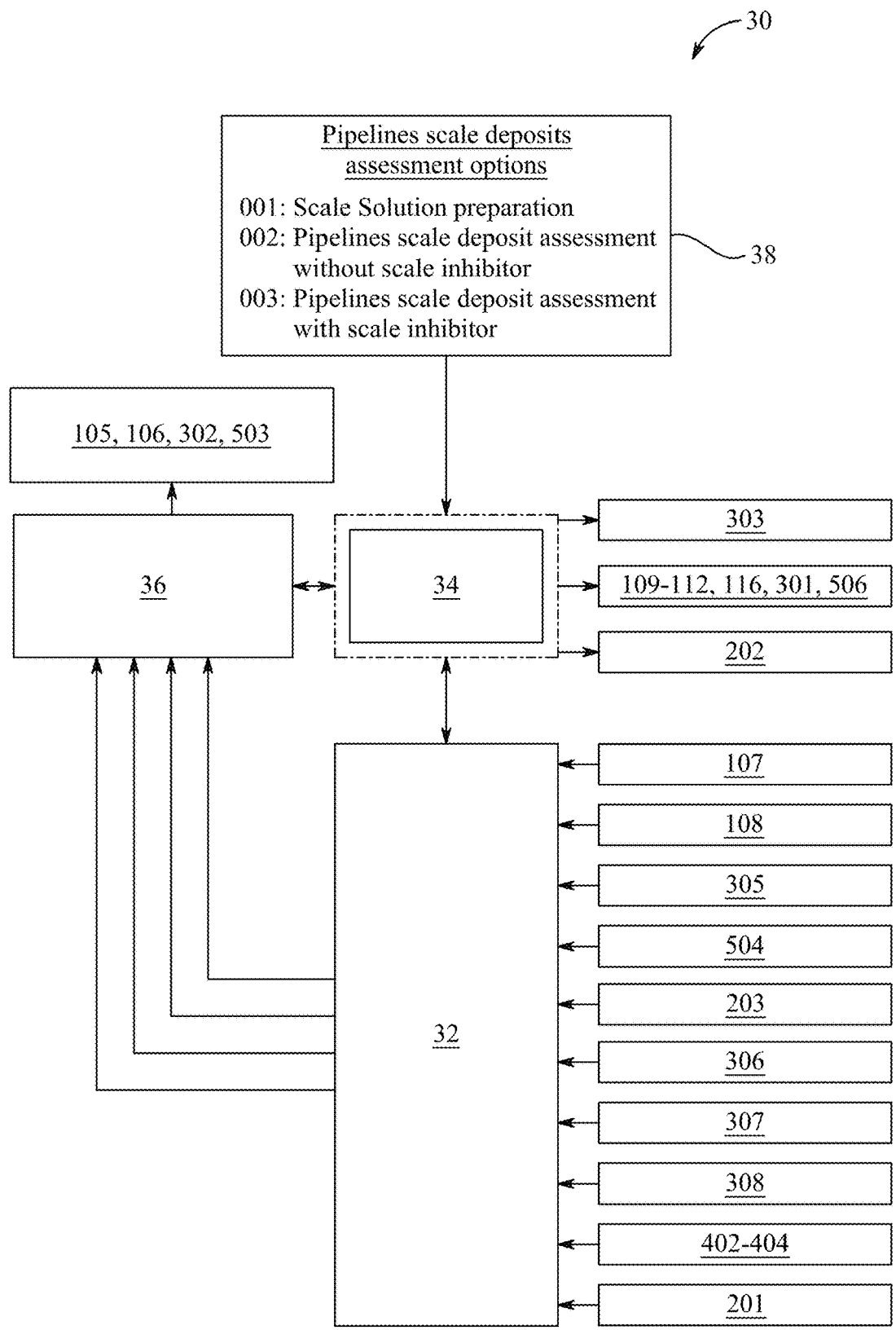
FIG. 4 is a schematic block diagram of a measurement and control unit of the scale assessment system, according to certain embodiments.

FIG. 4 illustrates a schematic block diagram of the measurement and control unit 600 of the scale assessment system 20. The measurement and control unit 600 is configured to determine one of the amount of scale deposit in the plurality of connected U-shaped test pipes 401 and the amount of scale inhibitor required to prevent scale deposit in the plurality of connected U-shaped test pipes 401. As shown, the measurement and control unit 30 includes a data acquisition system 32, a programmable logic controller 34, a flow controller 36, a user interface 38. The measurement and control unit 30 is an integral part of the scale assessment system 10 for assessing scale deposits without inhibitor, as well as the scale assessment system 20 for assessing scale deposits with and without inhibitor. The various components of the measurement and control unit 30 work in conjunction to operate the different flow loops and components of the scale assessment systems 20 based on user input from the user interface 38. In general, the data acquisition system 32 serves as the central point for collecting all operational data in the scale assessment system 20. The data acquisition system 32 is configured to record and store the real-time data for offline detailed data analysis. The programmable logic controller 34 receives inputs from the data acquisition system 32 and processes this information to execute control commands across the scale assessment system 20. Working in conjunction with the programmable logic controller 34, the flow controller 36 specifically manages the variable flow rates of solutions within the scale assessment system 20. The integration of the data acquisition system 32, the programmable logic controller 34, and the flow controller 36 within the measurement and control unit 30 provides for a high degree of automation and precision in managing the scale assessment system 20.

The data acquisition system 32 includes a microprocessor having a memory including program instructions and at least one processor configured to execute the program instructions. These configurational details are discussed later in reference to FIGS. 6-9. Herein, the data acquisition system 32 receives data signals from the first salt solution flow meter 107 and the second salt solution flow meter 108 of the first piping system 12, the fluid level sensor 201 and the tank temperature sensor 203 of the insulated temperature controlled scale solution holding tank 200, the scale solution flow meter 305, the scale solution temperature sensor 306, the scale solution pressure sensor 307, the differential pressure sensor 308 and the ultrasonic sensors 402-404 of the third piping system 16 and the scale inhibitor flow meter 504 of the fourth piping system 18. Specifically, the first salt solution flow meter 107 and the second salt solution flow meter 108, located within the first piping system 12, provide real-time data on the flow rates of the first solution and the second solution, respectively, for ensuring that the solutions are mixed in correct proportions to form the scale solution. The fluid level sensor 201 and the tank temperature sensor 203 monitor the level and temperature of the scale solution within the insulated temperature controlled scale solution holding tank 200, to maintain the correct level and the correct temperature of the solution for consistent scale formation under controlled conditions. The scale solution flow meter 305, the scale solution temperature sensor 306, and the scale solution pressure sensor 307, part of the third piping system 16, provide measurements related to the flow, temperature, and pressure of the scale solution, to ensure that the scale solution is delivered under conditions that mimic those in actual pipelines. The differential pressure sensor 308, also located in the third piping system 16, measures the pressure difference across the U-shaped test pipes 401, providing insights into any flow restrictions caused by scale deposits. The ultrasonic sensors 402-404 measure the thickness of scale deposits on the interior surfaces of the pipes, providing feedback on the scale accumulation during tests. The scale inhibitor flow meter 504, located in the fourth piping system 18, measures the flow rate of the scale inhibitor being added to the scale deposit assessment flow loop 300, for assessing the efficacy of the scale inhibitor used during the scale prevention tests.

Further, the data acquisition system 32 transmits the data signals of the first salt solution flow meter 107, the second salt solution flow meter 108, the scale solution flow meter 305 and the scale inhibitor flow meter 504 to the flow controller 36. The first salt solution flow meter 107 measures the rate at which the first solution (calcium chloride) is delivered from the first salt solution tank 101 through the first piping system 12. Similarly, the second salt solution flow meter 108 monitors the flow rate of the second solution (sodium sulfate) from the second salt solution tank 102. The data acquisition system 32 collects these flow rates data and transmits it to the flow controller 36, for ensuring that the calcium ions and sulfate ions concentration in the scale solution are maintained at the desired level for accurate simulation conditions. The scale solution flow meter 305, located within the third piping system 16, measures the overall flow rate of the scale solution towards the U-shaped test pipes 401. The data acquisition system 32 sends this data to the flow controller 36 to ensure that the scale solution is circulated at a rate that matches the specific test conditions. The scale inhibitor flow meter 504 measures the amount of scale inhibitor being introduced into the scale solution through the fourth piping system 18. The data acquisition system 32 sends this data to the flow controller 36 to facilitate precise adjustments to the scale inhibitor flow rate, for evaluating the effectiveness of the scale inhibitor under varying operational conditions. By transmitting these data signals, the data acquisition system 32 facilitates the flow controller 36 to dynamically adjust the flow rates of the different solutions based on real-time measurements.

The data acquisition system 32 also transmits the data signals of the fluid level sensor 201 and the tank temperature sensor 203 of the insulated temperature controlled scale solution holding tank 200, the scale solution temperature sensor 306, the scale solution pressure sensor 307, the differential pressure sensor 308 and the ultrasonic sensors 402-404 of the third piping system 16 to the programmable logic controller 34. Herein, the fluid level sensor 201 monitors the level of the scale solution within the insulated temperature controlled scale solution holding tank 200. The data acquisition system 32 sends this data to the programmable logic controller 34, which uses this data to maintain optimal solution levels through automated adjustments to inflows or outflows. The tank temperature sensor 203 measures the temperature of the scale solution in the insulated temperature controlled scale solution holding tank 200. The data acquisition system 32 sends this data to the programmable logic controller 34, which relies on this data to regulate the heating element within the insulated temperature controlled scale solution holding tank 200, ensuring the scale solution temperature remains within specified parameters. The scale solution temperature sensor 306 provides measurements of the temperature of the scale solution within the third piping system 16 as it moves towards the U-shaped test pipes 401. The data acquisition system 32 sends this data to the programmable logic controller 34, which uses this data to adjust system settings to maintain the desired test conditions. The scale solution pressure sensor 307 monitors the pressure within the scale solution as it circulates through the third piping system 16. The data acquisition system 32 sends this data to the programmable logic controller 34, which uses this data to adjust pumps or valves as required to ensure the pressure remains within safe and effective operating limits. The differential pressure sensor 308, located across the U-shaped test pipes 401, measures the pressure differential across these pipes, which is indicative of potential scale buildup obstructing the flow. The data acquisition system 32 sends this data to the programmable logic controller 34, which uses this data to assess the effectiveness of the scale formation under current test conditions. The ultrasonic sensors 402-404 measure the thickness of scale deposits forming on the interior surfaces of the U-shaped test pipes 401. The data acquisition system 32 sends this data to the programmable logic controller 34, which uses this data to monitor and analyze the scaling process, providing feedback on the scaling characteristics and the effectiveness of any scale inhibitors being tested. By transmitting these data signals, the data acquisition system 32 ensures that the programmable logic controller 34 can execute precise control over operations of the scale assessment system 20 based on real-time feedback.

In the scale assessment system 20, the flow controller 36 is operatively connected to receive the data signals of the first salt solution flow meter 107, the second salt solution flow meter 108, the scale solution flow meter 305 and the scale inhibitor flow meter 504 from the data acquisition system 32, and generate control signals which operate the first variable flow salt solution pump 105 and the second variable flow salt solution pump 106 of the first piping system 12, the high-pressure variable flow scale solution pump 302 of the third piping system 16 and the fixed rate scale inhibitor pump 503 of the fourth piping system 18. The flow controller 36 is operatively connected to the data acquisition system 32, from which it receives continuous data signals. These include flow rate readings from the first salt solution flow meter 107 and the second salt solution flow meter 108, which monitor the flow rates of the first and second solutions, respectively, in the first piping system 12. The flow controller 36 also receives data from the scale solution flow meter 305, which measures the flow rate of the mixed scale solution in the third piping system 16, and from the scale inhibitor flow meter 504, which tracks the amount of scale inhibitor being pumped through the fourth piping system 18. Utilizing the flow rate data received, the flow controller 36 generates and sends control signals to various pumps and solenoid valves in the scale assessment system 20 that are responsible for moving these fluids. FIGS. 1 and 2 illustrate the connections between the flow controller 36 and the various pumps being controlled thereby. Specifically, the first variable flow salt solution pump 105 and the second variable flow salt solution pump 106, located in the first piping system 12, control the delivery of the individual salt solutions from their respective solution tanks 101, 102 to the homogenizer 115. The control signals adjust the flow rates of these pumps 105, 106 based on the current requirements of the scale assessment system 20, ensuring the correct ratios and volumes of solutions are mixed. The high-pressure variable flow scale solution pump 302, in the third piping system 16, transfers the scale solution through to the U-shaped test pipes 401. The control signals from the flow controller 36 regulate the pressure and flow rate of the high-pressure variable flow scale solution pump 302, based on the current requirements of the scale assessment system 20 to simulate various pressure conditions that might be encountered in actual pipelines. The fixed rate scale inhibitor pump 503, located in the fourth piping system 18, controls the delivery of the scale inhibitor into the scale solution. The flow controller 36 adjusts the operation of the fixed rate scale inhibitor pump 503 to ensure that the predetermined amount of scale inhibitor is mixed into the scale solution, facilitating accurate testing of effectiveness of the scale inhibitor. By effectively managing these components, the flow controller 36 ensures precise control over the flow of solutions through the scale assessment system 20.

The programmable logic controller 34 is operatively connected to the data acquisition system 32 and the flow controller 36. This facilitates the transfer of data and control signals between these components, ensuring that the programmable logic controller 34 can effectively coordinate various subsystems of the scale assessment system 20. The programmable logic controller 34 is configured to receive the control signals from the flow controller 36, the data signals of the fluid level sensor 201 and the tank temperature sensor 203 of the insulated temperature controlled scale solution holding tank 200, the scale solution temperature sensor 306, the scale solution pressure sensor 307, the differential pressure sensor 308 and the ultrasonic sensors 402-404 of the third piping system 16 and generate ON/OFF signals which actuate the first variable flow salt solution pump 105, the second variable flow salt solution pump 106, the high-pressure variable flow scale solution pump 302, the pressure regulator 303, the plurality of solenoid valves 109-112 and the heating element 202. The fluid level sensor 201 and the tank temperature sensor 203, located within the insulated temperature controlled scale solution holding tank 200, provide real-time data regarding the level and temperature of the scale solution. The scale solution temperature sensor 306, the scale solution pressure sensor 307, and the differential pressure sensor 308, located within the third piping system 16, monitor the temperature and pressure of the scale solution as well as the differential pressure across the U-shaped test pipes 401, providing data for adjusting system parameters to meet test conditions. The ultrasonic sensors 402-404 measure the thickness of scale deposits on the interior surfaces of the U-shaped test pipes 401, providing insights into the scale formation dynamics during the testing process. Utilizing the received data and control signals, the programmable logic controller 34 generates ON/OFF signals to actuate various mechanical components within the scale assessment system 20. The programmable logic controller 34 actuates the first variable flow salt solution pump 105 and the second variable flow salt solution pump 106 to the flow of salt solutions from the first and second salt solution tanks 101, 102 to the homogenizer 115, ensuring the correct ratios and volumes are delivered for the formation of the scale solution. The programmable logic controller 34 actuates the high-pressure variable flow scale solution pump 302 to direct the scale solution through the third piping system 16 to the U-shaped test pipes 401 under conditions that simulate real-world pipeline environments. The programmable logic controller 34 actuates the pressure regulator 303 to adjust the pressure within the third piping system 16 to maintain optimal conditions for scale deposition assessments. The programmable logic controller 34 actuates the solenoid valves 109-112, 211, 301 to control the directional flow of solutions within the piping systems 12-16. The programmable logic controller 34 actuates the heating element 202 for maintaining the scale solution at the required temperature within the insulated temperature controlled scale solution holding tank 200, for accurate simulation of thermal conditions in pipelines. By actuating these components, the programmable logic controller 34 ensures that the scale assessment system 20 operates efficiently, maintaining the conditions necessary for accurate scale formation testing.

Further, as depicted in FIG. 4, the user interface 38 has a plurality of selectable scale deposit assessment options including a scale deposit assessment option without scale inhibitor solution and a scale deposit assessment option with scale inhibitor solution. These choices provide flexibility in testing and facilitate comprehensive analysis of scale formation under varying conditions. As shown, the user interface 38 is connected to the programmable logic controller 34, serving as the input device through which testing preferences are communicated thereto. The programmable logic controller 34 is configured to receive a scale deposit assessment option and generate the ON/OFF signals which actuate the first variable flow salt solution pump 105, the second variable flow salt solution pump 106, the high-pressure variable flow scale solution pump 302, the fixed rate scale inhibitor pump 503, the pressure regulator 303, the plurality of solenoid valves 109-112, 211, 301 and the heating element 202 to perform the selected scale deposit assessment option. That is, upon receiving a selected scale deposit assessment option from the user interface 38, the programmable logic controller 34 processes this input to generate appropriate ON/OFF signals as previously described. The integration of the user interface 38 with the programmable logic controller 34 enhances the functionality of the scale assessment systems 20, by facilitating operators to easily select different testing options for different research or operational requirements.

In particular, the processor of the microprocessor is further configured to execute the program instructions to determine an amount of scale deposited on the U-shaped test pipes 401 from the data signals of the ultrasonic sensors 402-404 and the data signals of the differential pressure sensor 308. By integrating these data inputs, the processor can accurately quantify the scale deposits, providing feedback on the scale formation. Now, when the scale deposit assessment option without scale inhibitor solution is selected, the processor of the microprocessor is further configured to execute the program instructions to generate a data assessment of the amount of scale deposited on the U-shaped test pipes 401 based on the preset flow ratio of the first salt solution and the second salt solution. That is, when the scale deposit assessment option without scale inhibitor solution is selected via the user interface 38, the processor generates a detailed data assessment of the scale deposited on the U-shaped test pipes 401. This assessment considers the preset flow ratio of the first salt solution (calcium chloride) and the second salt solution (sodium sulfate) for example flowing into the homogenizer 115 to form the scale solution. By analyzing how the scale forms under these conditions, the processor helps identify the inherent scaling tendencies of the solution without interference from the scale inhibitor. Conversely, when the scale deposit assessment option with scale inhibitor solution is selected, the processor of the microprocessor is further configured to execute the program instructions to generate a data assessment of the amount of scale deposited on the U-shaped test pipes 401 based on the preset flow ratio of the first salt solution and the second salt solution and the amount of scale inhibitor solution mixed with the scale solution. The processor additionally analyzes the information regarding the amount of scale inhibitor solution mixed with the scale solution. The data assessment generated under these conditions evaluates the effectiveness of the scale inhibitor in reducing scale formation. This provides for determining the efficacy of different scale inhibitors and optimizing their use in real-world pipeline scenarios.

In aspects of the present disclosure, the flow controller 36 is configured to control the first variable flow salt solution pump 105 and the second variable flow salt solution pump 106 to modify a ratio of the first salt solution and the second salt solution pumped to the homogenizer 115 based on the selected scale deposit assessment. That is, the flow controller 36 is specifically configured to control the operation of the first variable flow salt solution pump 105 and the second variable flow salt solution pump 106 to modify the ratio of the first salt solution (calcium chloride) and the second salt solution (sodium sulfate) being pumped to the homogenizer 115. Such modification of the solution ratios by the flow controller 36 is based on the specific scale deposit assessment option selected through the user interface 38. Depending on whether the assessment is being conducted with or without scale inhibitors, and what type of scale deposit is being examined, different ratios of the salt solutions may be required to achieve the desired conditions for scale formation. By adjusting the flow rates and ratios of the salt solutions according to the selected assessment conditions, the flow controller 36 ensures that the scale formation conditions within the U-shaped test pipes 401 are maintained accurately.

Figure 6:
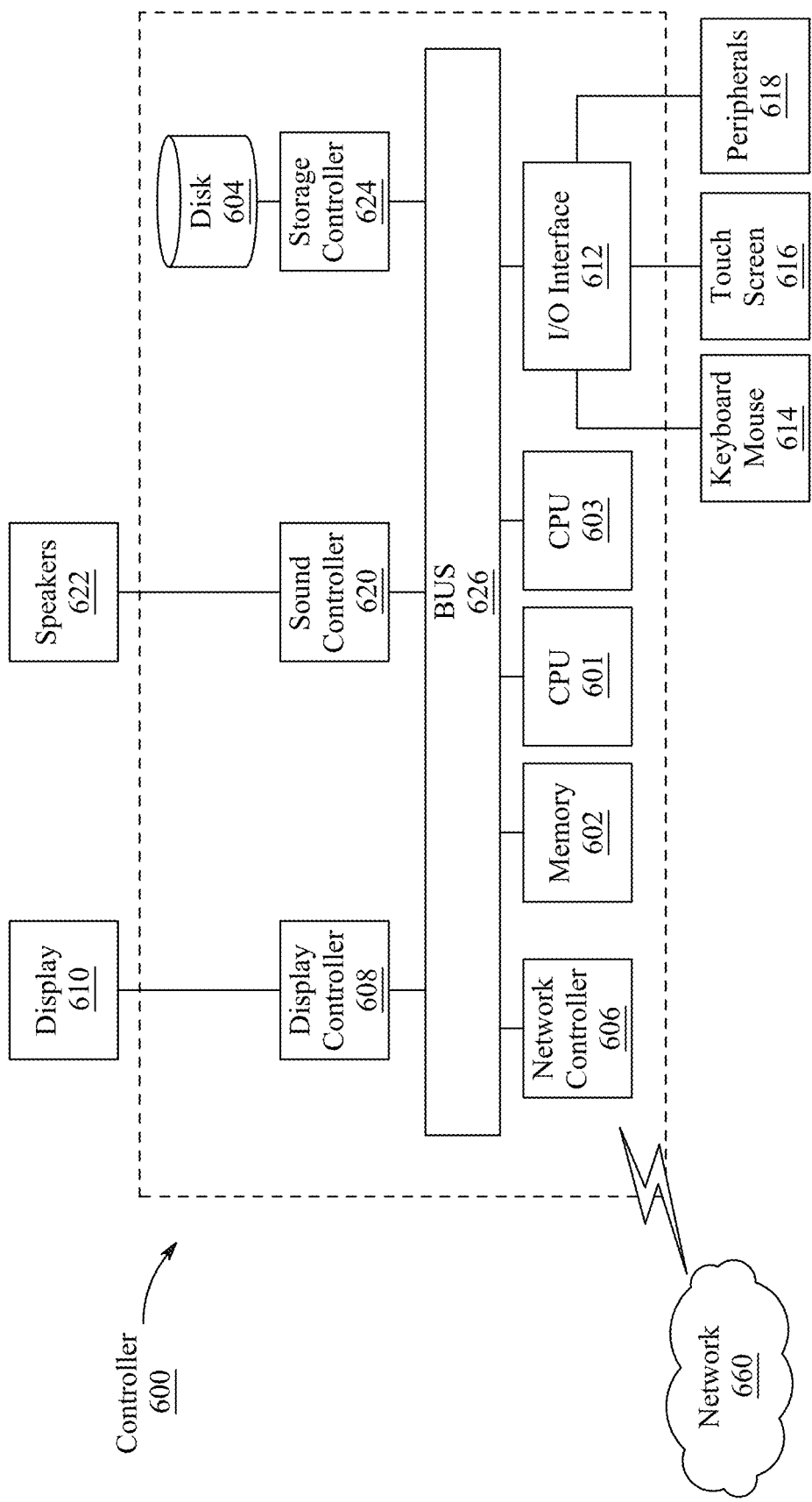
FIG. 6 is an illustration of a non-limiting example of details of computing hardware used in the computing system, according to certain embodiments.

In an aspect of the present disclosure, the microprocessor further includes a display screen 640 (as shown in FIG. 6). The display screen serves an interface for displaying operational data and results from scale deposit assessments for refence of the operators. Herein, the microprocessor is configured to display the data assessment, the flow rates of the first salt solution and the second salt solution, a flow rate of the scale solution, a flow rate of the scale inhibitor solution and the fluid level in the insulated temperature controlled scale solution holding tank 200 on the display screen. Displaying information about the data assessments related to scale deposits on the U-shaped test pipes 401 facilitates operators to quickly understand the effectiveness of the scale formation conditions and the performance of scale inhibitors if used. Displaying information about the flow rates of the first and second salt solutions helps in maintaining precise control over the solution inputs, ensuring optimal conditions for accurate testing. Displaying information about the fluid level in the insulated temperature controlled scale solution holding tank 200 provides for maintaining required level of the scale solution to complete the testing process. This capability of the flow controller 36 to dynamically adjust the ratios of the salt solutions being delivered to the homogenizer 115 is required for the flexibility and accuracy of the scale assessment system 20.

The scale assessment system 20 of the present disclosure can be utilized to evaluate different types of scale deposits commonly encountered in oil and gas production pipelines. In an aspect of the present disclosure, the scale is a calcium sulfate deposit on inner walls of the connected U-shaped test pipes 401. The calcium sulfate scale deposit builds up on interior surfaces of the U-shaped test pipes 401 when the calcium sulfate solution is circulated through the test section 400 under the set operating conditions of temperature, pressure, flow rate, and solution concentration. In other aspects of the present disclosure, the scale deposit is one of a calcium sulfate deposit, a barium sulfate deposit, a strontium sulfate deposit, a calcium carbonate deposit, a magnesium carbonate deposit, an iron carbonate deposit, an iron oxide deposit, a magnesium oxide deposit, a magnesium hydroxide deposit, and an iron sulfide deposit. For example, by using solutions of barium chloride and sodium sulfate, the scale assessment system 20 can assess barium sulfate scale deposits. Similarly, solutions of strontium chloride and sodium sulfate can be used to study strontium sulfate scales. The scale assessment system 20 can also assess carbonate scales like calcium carbonate by using calcium chloride and sodium carbonate solutions. Other types of scales like iron oxides, magnesium hydroxides, iron sulfides, etc. can also be evaluated by preparing and circulating the respective salt solutions through the test section 400. Herein, the scale is located on inner walls of the connected U-shaped test pipes 401.

In general, the scale deposits assessment procedure of the present disclosure utilizes a two-step process with the scale assessment system 20. The initial step involves the preparation of the scale solution with a known concentration using the variable flow pumps within the scale solution flow loop 100. The scale solution produced is subsequently stored within the insulated temperature controlled scale solution holding tank 200. It may be noted that before commencing the preparation of the scale solution, all solenoid valves 109-112, 211, 301, 506 are maintained in the closed position by the programmable logic controller 34. The gate valves of the first and second solution tanks 101, 102 remain open. The drain gate valve 209 is kept closed while the gate valves 208, 210 are left open. The desired first and second solution flow rates are set on the flow controller 36 and the scale solution preparation option (001) from the user interface 38 of the measurement and control unit 30 is selected. Upon selection of the scale solution preparation option (001), the programmable logic controller 34 receives a feedback signal from the fluid level sensor 201 and checks the fluid level in the insulated temperature controlled scale solution holding tank 200. If the fluid level in is below a reference level 'LR', the programmable logic controller 34 activates the solenoid valve 211 while keeping the solenoid valve 301 closed. After verifying the scale solution level, the programmable logic controller 34 opens the solenoid valves 109, 110 and initiates the variable flow salt solution pumps 105, 106. The solutions circulate at the preset flow rates in their respective closed loops, with flow rates are monitored by the salt solution flow meters 107, 108. Once the desired flow rates of the first and second solutions are reached, as indicated by the flow controller 36, the programmable logic controller 34 closes the solenoid valves 109, 110 and opens the solenoid valves 111, 112. The first and second solutions ($Ca^{2+}$ ions and $SO_4^{2-}$ ions) then merge into the homogenizer 115, ensuring that mixing of the two streams occurs efficiently. The one-way valves 113, 114 prevent premature mixing before reaching the homogenizer 115. When maximum level 'LM' of scale solution is achieved in the insulated temperature controlled scale solution holding tank 200, the data acquisition system 32 signals the programmable logic controller 34 to halt the pumps 105, 106 and subsequently close the solenoid valve 211 and the solenoid valves 111, 112. It may be appreciated that to prepare the scale solution of varying concentrations, the insulated temperature controlled scale solution holding tank 200 requires to be manually emptied by opening the drain gate valve 209. After draining is complete, the drain gate valve 209 is closed, and the steps are repeated to prepare a new batch of scale solution.

After the preparation of the scale solution (as described above), the scale deposit assessment flow loop 300 is employed to assess pipeline scale deposits both with and without the use of the scale inhibitor. The scale deposit assessment flow loop 300 facilitates the circulation of the prepared scale solution stored in the insulated temperature controlled scale solution holding tank 200 through the test section 400 in a closed loop to estimate the pipeline scale deposits.

The following steps are to be followed for assessment of the pipeline scale deposits without the scale inhibitor. Before starting the experiment for pipeline scale deposits assessment without the scale inhibitor, the solenoid valves 211, 301 in the scale deposit assessment flow loop 300 are kept in a closed position by the programmable logic controller 34. The gate valves 208, 210, associated with the insulated temperature controlled scale solution holding tank 200, remain in open positions, and the drain gate valve 209 is kept in a closed position. The desired scale solution flow rates is set in the flow controller 36 and also the required solution pressure and temperature is set in the programmable logic controller 34 for the current experiment. The option 'Pipelines Scale Deposit Assessment Without Scale Inhibitor' (002) from the user interface 38 of the measurement and control unit 30 is selected. Based on the selection of option (002), the programmable logic controller 34 switches the heating element 202 on or off to maintain the desired temperature during the experiment. The programmable logic controller 34 also receives measurement of temperature from the temperature sensor 203. Once the scale solution temperature in the insulated temperature controlled scale solution holding tank 200 reaches the set value, the programmable logic controller 34 opens the solenoid valve 301 and activates the high-pressure variable flow scale solution pump 302 while operating the pressure regulator 303. After achieving the desired scale solution flow rate, as managed by the flow controller 36, the programmable logic controller 34 automatically adjusts the pressure regulator 303 until a line pressure measure by the pressure sensor 307 reaches the set value. During this process, the flow controller 36 maintains the desired scale solution flow rate by adjusting speed of the high-pressure variable flow scale solution pump 302. With the desired scale solution flow rate, temperature, and pressure achieved, the high-pressure variable flow scale solution pump 302 continuously circulates the scale solution in a closed loop through the test section 400, which consists of the U-shaped test pipes 401 equipped with the ultrasonic sensors 402-404. The ultrasonic sensors 402-404 measure the thickness of scale deposits, and the differential pressure sensor 308 monitors the pressure drop across the inlet pipe 400a and the outlet pipe 400b. Throughout the experiment, the programmable logic controller 34 continuously monitors the solution temperature, via the scale solution temperature sensor 306, and line pressure via the scale solution pressure sensor 307, adjusting the heating element 202 and the pressure regulator 303 accordingly. The flow controller 800 sustains the solution flow rate by controlling the speed of the high-pressure variable flow scale solution pump 302. The data acquisition system 32 is programmed to record and display real-time data such as the scale solution flow rate from the flow meter 305, the temperature sensor 306, the pressure sensor 307, the ultrasonic sensors 402-404 readings, and the differential pressure sensor 308 across the U-shaped test pipes 401 until the experiment concludes. This recorded data mat then be analyzed in detail to assess the scale deposits. To conduct the pipeline scale deposits experiment under varying conditions of scale solution concentration, flow rate or velocity, pressure, and temperature, the above described steps may be repeated, ensuring comprehensive testing across different scenarios.

The following steps are to be followed for assessment of the pipeline scale deposits with the scale inhibitor. Before starting the experiment for pipeline scale deposits assessment with the scale inhibitor, the solenoid valves 211, 301, 506 in the scale deposit assessment flow loop 300 are maintained in a closed position by the programmable logic controller 34. The gate valves 208, 210 remain open, the drain gate valve 209 is kept closed, and the gate valve 502 of the scale inhibitor tank 501 is opened. The desired scale solution flow rates and the fixed quantity of scale inhibitor are set in the flow controller 36. Also, the required solution pressure and temperature are set in the programmable logic controller 34 for the current experiment. Further, the option 'Pipelines Scale Deposit Assessment with Scale Inhibitor' (003) is selected from the user interface 38 of the measurement and control unit 30. Upon selecting option (003), the programmable logic controller 34 controls the heating element 202 to maintain the desired temperature of the scale solution. The feedback from the temperature sensor 203 is used for such control. When the temperature of the scale solution reaches the predetermined value, the programmable logic controller 34 opens the solenoid valve 301, activates the high-pressure variable flow scale solution pump 302, and operates the pressure regulator 303. Once the flow controller 36 confirms the desired scale solution flow rate, it signals the programmable logic controller 34, which then adjusts the pressure regulator 303 until the line pressure, as measured by the pressure sensor 307, reaches the set value. Throughout this process, the flow controller 36 maintains the scale solution flow rate by modulating the speed of the high-pressure variable flow scale solution pump 302. With the desired flow rate, temperature, and pressure of the scale solution established, the high-pressure variable flow scale solution pump 302 continuously circulates the scale solution through the test section 400. After all parameters are set, the programmable logic controller 34 opens the solenoid valve 506 and instructs the flow controller 36 to inject the fixed amount of scale inhibitor using the fixed rate scale inhibitor pump 503. The quantity of the scale inhibitor is monitored via feedback from the scale inhibitor flow meter 504. Once the set amount of scale inhibitor is injected into the scale deposit assessment flow loop 300, the programmable logic controller 34 commands the flow controller 36 to stop pump operation and closes the solenoid valve 506. Herein, the one-way valve 505 prevents scale solution from entering the scale inhibitor flow loop 500. Throughout the experiment, the programmable logic controller 34 continually monitors the temperature, via the temperature sensor 306, and the line pressure, via the pressure sensor 307, adjusting the heating element 202 and the pressure regulator 303 as required. The flow controller 36 keeps the solution flow rate constant by modulating the speed of the high-pressure variable flow scale solution pump 302. The data acquisition system 32 records and displays the real-time data for a detailed analysis of scale deposits with the scale inhibitor option. To conduct experiments under different conditions of scale solution concentration, flow rate or velocity, pressure, temperature, and scale inhibitor quantity, the above described steps may be repeated, ensuring comprehensive testing across different scenarios.

Figure 5:
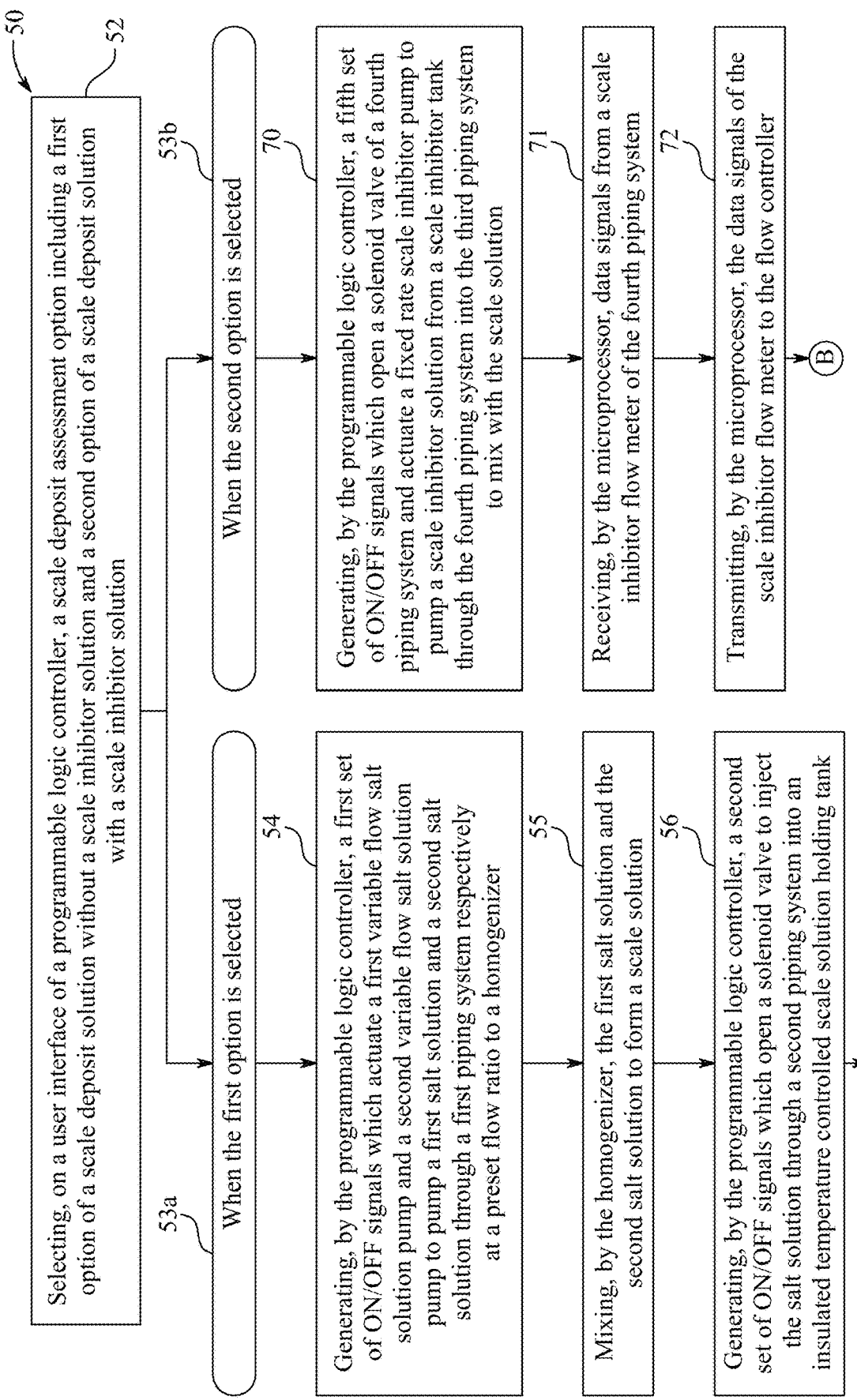
FIG. 5 is an exemplary flowchart of a method for performing a scale deposit assessment, according to certain embodiments.
Figure 5:
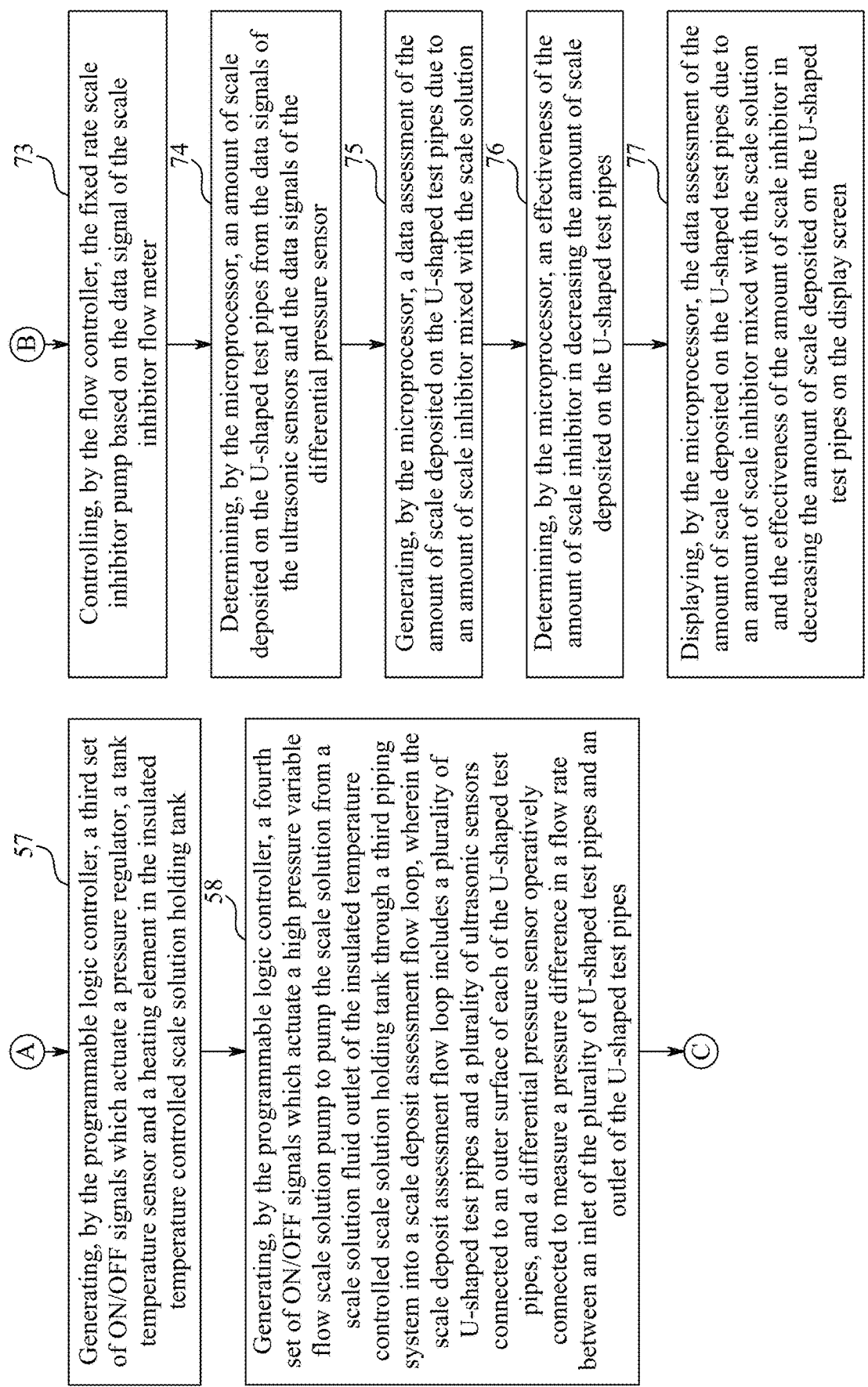
Figure 5:
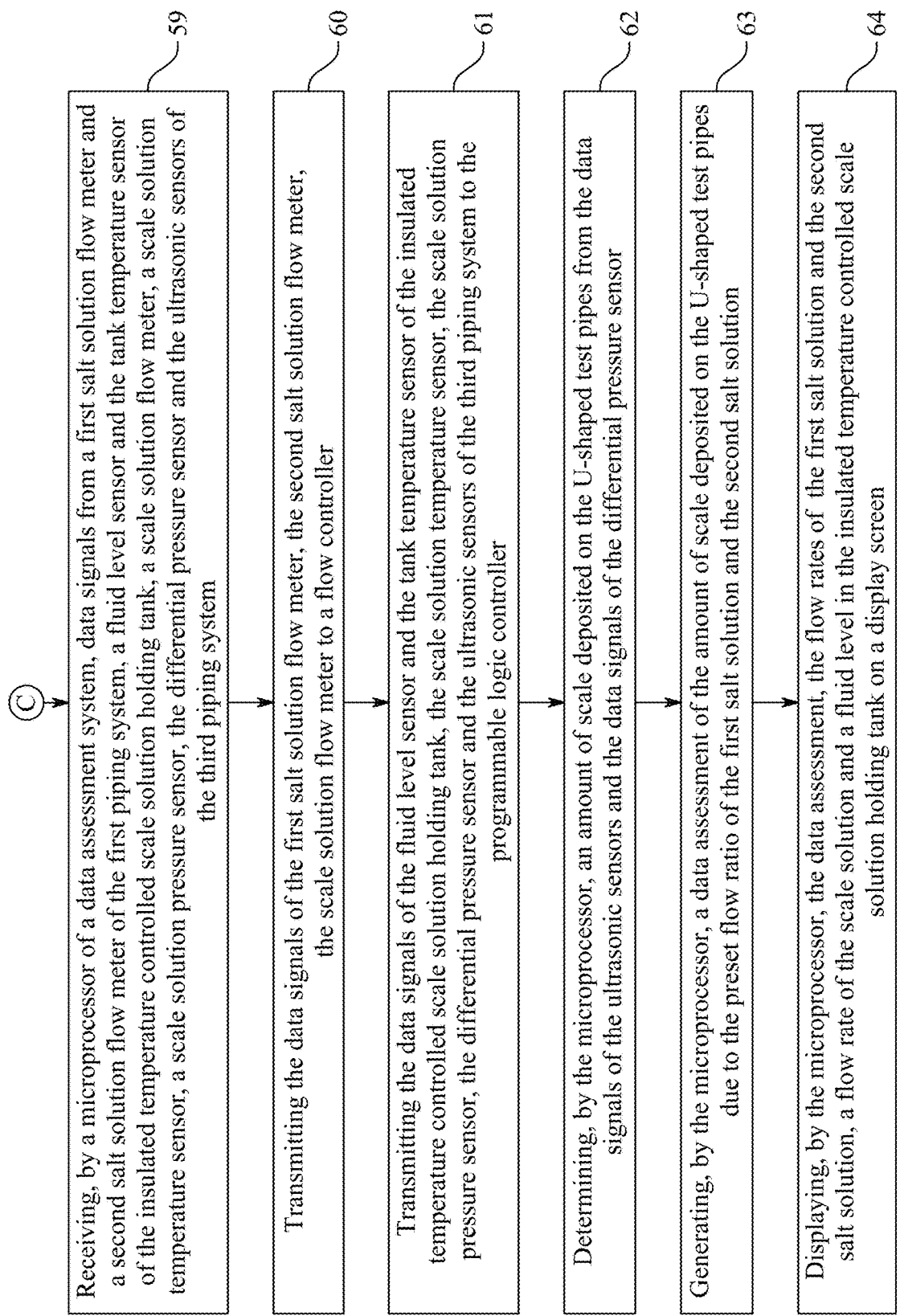

Referring to FIG. 5, the present disclosure further provides a method (as represented by a flowchart, referred by reference numeral 50) for performing a scale deposit assessment. The method 50 for performing the scale deposit assessment includes a series of steps. These steps are only illustrative, and other alternatives may be considered where one or more steps are added, one or more steps are removed, or one or more steps are provided in a different sequence without departing from the scope of the present disclosure. Various variants disclosed above, with respect to the aforementioned scale assessment system 20 apply mutatis mutandis to the present method 50.

At step 52, the method 50 includes selecting, on the user interface 38 of the programmable logic controller 34, the scale deposit assessment option including a first option of a scale deposit solution without a scale inhibitor solution (002) and a second option of a scale deposit solution with a scale inhibitor solution (003). Selecting between options with or without scale inhibitors on the user interface 38 guides the subsequent actions, setting the parameters for the specific assessment to be conducted. Now, when the first option is selected (as in block 53a), at step 54, the method 50 includes generating, by the programmable logic controller 34, a first set of ON/OFF signals which actuate the first variable flow salt solution pump 105 and the second variable flow salt solution pump 106 to pump the first salt solution and the second salt solution through the first piping system 12 respectively at the preset flow ratio to the homogenizer 115. These pumps 105, 106 deliver the first and second salt solutions at eh preset flow ratio to the homogenizer 115 for preparing the scale solution under controlled conditions. At step 55, the method 50 includes mixing, by the homogenizer 115, the first salt solution and the second salt solution to form the scale solution. This ensures that the first and second salt solutions are thoroughly combined to produce a consistent and uniform scale solution, for accurate scale formation testing. At step 56, the method 50 includes generating, by the programmable logic controller 34, a second set of ON/OFF signals which open the solenoid valve 211 to inject the salt solution through the second piping system 14 into the insulated temperature controlled scale solution holding tank 200. This ensures the prepared scale solution is securely stored and maintained at desired conditions for testing.

At step 57, the method 50 includes generating, by the programmable logic controller 34, a third set of ON/OFF signals which actuate the pressure regulator 303, the tank temperature sensor 203 and the heating element 202 in the insulated temperature controlled scale solution holding tank 200. These components work together to adjust and maintain the temperature and pressure within the insulated temperature controlled scale solution holding tank 200, ensuring the scale solution remains at optimal conditions for the experiments. At step 58, the method 50 includes generating, by the programmable logic controller 34, a fourth set of ON/OFF signals which actuate the high-pressure variable flow scale solution pump 302 to pump the scale solution from the scale solution fluid outlet 200b of the insulated temperature controlled scale solution holding tank 200 through the third piping system 16 into the scale deposit assessment flow loop 300. Herein, the scale deposit assessment flow loop 300 includes the plurality of U-shaped test pipes 401 and the plurality of ultrasonic sensors 402-404 connected to the outer surface of each of the U-shaped test pipes 401, and the differential pressure sensor 308 operatively connected to measure the pressure difference in the flow rate between an inlet (the inlet pipe 400a) of the plurality of U-shaped test pipes 401 and the outlet (the outlet pipe 400b) of the U-shaped test pipes 401. This moves the scale solution from the insulated temperature controlled scale solution holding tank 200 through the third piping system 16 to the scale deposit assessment flow loop 300, where the actual scale deposit assessment takes place.

At step 59, the method 50 includes receiving, by the microprocessor of the data acquisition system 32, data signals from the first salt solution flow meter 107 and the second salt solution flow meter 108 of the first piping system 12, the fluid level sensor 201 and the tank temperature sensor 203 of the insulated temperature controlled scale solution holding tank 200, the scale solution flow meter 305, the scale solution temperature sensor 306, the scale solution pressure sensor 307, the differential pressure sensor 308 and the ultrasonic sensors 402-404 of the third piping system 16. At step 60, the method 50 includes transmitting, by the microprocessor, the data signals of the first salt solution flow meter 107, the second salt solution flow meter 108, the scale solution flow meter 305 to the flow controller 36. At step 61, the method 50 includes transmitting, by the microprocessor, the data signals of the fluid level sensor 201 and the tank temperature sensor 203 of the insulated temperature controlled scale solution holding tank 200, the scale solution temperature sensor 306, the scale solution pressure sensor 307, the differential pressure sensor 308 and the ultrasonic sensors 402-404 of the third piping system 16 to the programmable logic controller 34. The microprocessor of the data acquisition system 32 collects and analyzes such data from various sensors and flow meters for monitoring and controlling the experiment.

At step 62, the method 50 includes determining, by the microprocessor, the amount of scale deposited on the U-shaped test pipes 401 from the data signals of the ultrasonic sensors 402-404 and the data signals of the differential pressure sensor 308. Such analysis is utilized for assessing the effectiveness of the scale formation conditions and the impact of any scale inhibitors used. At step 63, the method 50 includes determining, by the microprocessor, the amount of scale deposited on the U-shaped test pipes 401 from the data signals of the ultrasonic sensors 402-404 and the data signals of the differential pressure sensor 308. Herein, the microprocessor generates a comprehensive assessment of the scale deposited, incorporating all relevant data. At step 64, the method 50 includes displaying, by the microprocessor, the data assessment, the flow rates of the first salt solution and the second salt solution, the flow rate of the scale solution and the fluid level in the insulated temperature controlled scale solution holding tank 200 on the display screen. The microprocessor displays information about the scale assessment along with flow rates, temperature, and fluid levels on the display screen, providing a detailed overview of outcomes of the experiment and facilitating operators to make informed decisions about scale management strategies.

Further, as shown in FIG. 5, when the second option is selected (as in block 53b), at step 70, the method 50 includes generating, by the programmable logic controller 34, a fifth set of ON/OFF signals which open the solenoid valve 506 of the fourth piping system 18 and actuate the fixed rate scale inhibitor pump 503 to pump the scale inhibitor solution from the scale inhibitor tank 501 through the fourth piping system 18 into the third piping system 16 to mix with the scale solution. This ensures the precise mixing of the scale inhibitor with the scale solution, crucial for assessing its efficacy in mitigating scale formation. At step 71, the method 50 includes receiving, by the microprocessor, data signals from a scale inhibitor flow meter 504 of the fourth piping system 18. This data is used for verifying the amount of scale inhibitor being injected into the scale solution, ensuring that the intended dosage is accurately delivered. At step 72, the method 50 includes transmitting, by the microprocessor, the data signals of the scale inhibitor flow meter 504 to the flow controller 36. This configures the flow controller 36 to adjust the operation of the fixed rate scale inhibitor pump 503 based on real-time flow data. At step 73, the method 50 includes controlling, by the flow controller 36, the fixed rate scale inhibitor pump 503 based on the data signal of the scale inhibitor flow meter 504. Adjustments made by the flow controller ensure that the scale inhibitor is delivered at the correct rate, 5 ensuring the consistency of the experimental conditions.

At step 74, the method 50 includes determining, by the microprocessor, an amount of scale deposited on the U-shaped test pipes 401 from the data signals of the ultrasonic sensors 402-404 and the data signals of the differential pressure sensor 308. This analysis helps quantify the scale buildup, providing a measure of the scale formation under the influence of the scale inhibitor. At step 75 the method 50 includes generating, by the microprocessor, a data assessment of the amount of scale deposited on the U-shaped test pipes 401 due to an amount of scale inhibitor mixed with the scale solution. This data assessment helps to evaluate how effectively the scale inhibitor prevents or reduces scale deposition. At step 76, the method 50 includes determining, by the microprocessor, an effectiveness of the amount of scale inhibitor in decreasing the amount of scale deposited on the U-shaped test pipes 401. This determination helps in understanding performance of the scale inhibitor and for adjusting its quantity. At step 77, the method 50 includes displaying, by the microprocessor, the data assessment of the amount of scale deposited on the U-shaped test pipes 401 due to the amount of scale inhibitor mixed with the scale solution and the effectiveness of the amount of scale inhibitor in decreasing the amount of scale deposited on the U-shaped test pipes 401 on the display screen. Such display provides an overview of the experimental outcomes, facilitating operators to visualize and analyze the impact of the scale inhibitor on scale formation directly.

In an aspect of the present disclosure, the method 50 also includes selecting, on the user interface 38, a new preset ratio of the ratio of the first salt solution and the second salt solution based on the data assessment of the selected option. Operators use the user interface 38 to select the new preset ratio for the ratio of the first salt solution to the second salt solution. This selection is based on the data assessment from previously conducted tests, which provide insights into the optimal conditions for scale formation or prevention. Adjusting the ratio on the user interface 38 provides for adapting the chemical composition of the scale solution to meet specific testing requirements. The method 50 further includes controlling, by the flow controller 36, the first variable flow salt solution pump 105 and the second variable flow salt solution pump 106 to modify the ratio of the first salt solution and the second salt solution pumped to the homogenizer 115 based on the new preset ratio. This control ensures that the ratio of the first salt solution and the second salt solution being delivered to the homogenizer 115 is adjusted to match the newly selected settings. The ability to modify the ratio dynamically provides for fine-tuning the conditions under which the scale solutions are prepared, facilitating more accurate and targeted assessments of scale formation.

In an aspect of the present disclosure, the method 50 further includes modifying, by the programmable logic controller 34, the first set of ON/OFF signals, the second set of ON/OFF signals, the third set of ON/OFF signals, the fourth set of ON/OFF signals and the fifth set of ON/OFF signals based on the data assessment of the selected option. The first set of ON/OFF signals are modified to control the first and second variable flow salt solution pumps 105, 106, ensuring the salt solutions are pumped at the correct rates to the homogenizer 115, according to the newly selected ratio or testing conditions. The second set of ON/OFF signals are modified to manage the opening and closing of solenoid valves that direct the flow of the mixed scale solution into the insulated temperature controlled scale solution holding tank 200, ensuring that the scale solution is introduced appropriately. The third set of ON/OFF signals are modified to control devices such as the pressure regulator 303, the tank temperature sensor 203, and the heating element 202 within the insulated temperature controlled scale solution holding tank 200, ensuring that the scale solution is maintained at the optimal conditions for the experiments. The fourth set of ON/OFF signals are modified to align the operation of the high-pressure variable flow scale solution pump 302, which pumps the scale solution from the tank through the third piping system 16 to the scale deposit assessment flow loop 300, with the new experimental conditions, ensuring the correct flow rate, pressure, and delivery of the scale solution to the test section 400. The fifth set of ON/OFF signals are modified based on the assessment of the effectiveness of the scale inhibitor in previous tests and are adjusted to optimize the concentration and timing of delivery of the scale inhibitor during the testing.

The scale assessment system 20 and the method 50 of the present disclosure provide significant advancement in the assessment of scale deposits within pipeline systems, particularly enhancing the capability to dynamically adjust and monitor the conditions under which scale formations are evaluated. The integrated approach provides for controlling and modifying the properties of the scale solution, and also to maintain precise control over the temperature and pressure conditions within the insulated temperature controlled scale solution holding tank 200. This control ensures that the scale formation conditions within the scale deposit assessment flow loop 300 are consistently optimal for accurate assessments. Moreover, the ability of the flow controller 36 to adjust the flow rates of the first variable flow salt solution pump 105 and the second variable flow salt solution pump 106 based on selected options ensures that the scale solution, formed by the homogenizer 115, consistently matches the desired chemical conditions for accurate testing.

Furthermore, the ability of the microprocessor of the data acquisition system 32 to receive, process, and display real-time data from the ultrasonic sensors 402-404 and the differential pressure sensor 308 provides a detailed analysis of scale formation. The inclusion of the user interface 38 on the programmable logic controller 34, which provides the selection between a scale deposit assessment option without a scale inhibitor solution and with a scale inhibitor solution, provides a level of flexibility. This feature facilitates operators to seamlessly switch between testing scenarios, effectively comparing the impact of various scale management strategies in real-time. This data-driven approach provides for immediate adjustments and provides a comprehensive understanding of the effectiveness of scale inhibitors when introduced through the scale inhibitor flow loop 500.

A first embodiment describes the scale assessment system 20, comprising the scale solution flow loop 100, the insulated temperature controlled scale solution holding tank 200, the scale deposit assessment flow loop 300, the scale inhibitor flow loop 500, and the measurement and control unit 600 configured to determine one of the amount of scale deposit in the plurality of connected U-shaped test pipes 401 and the amount of scale inhibitor required to prevent scale deposit in the plurality of connected U-shaped test pipes 401.

In an aspect, the scale assessment system 20 includes a scale solution flow loop 100 which comprises a first salt solution tank 101, a second salt solution tank 102, a first piping system 12 having the first flow path connected to the first salt solution tank 101, wherein the first flow path includes the first variable flow salt solution pump 105 and the first salt solution flow meter 107 and the second flow path connected to the second salt solution tank 102, wherein the second flow path includes a second variable flow salt solution pump 106 and a second salt solution flow meter 108, wherein the first piping system 12 further includes the plurality of solenoid valves 109-112, the plurality of one-way valves 113, 114 and the plurality of gate valves 103, 104, and the homogenizer 115 connected to the first piping system 12, wherein the homogenizer 115 is configured to receive the first salt solution and the second salt solution and mix the first salt solution and the second salt solution to form the scale solution.

In an aspect, the scale assessment system 20 includes a first salt solution tank 101 is configured to hold the mixture of calcium chloride and water, and the second salt solution tank 102 is configured to hold the mixture of sodium sulfate and water, wherein the scale solution comprises calcium sulfate.

In an aspect, the scale assessment system 20 includes an insulated temperature controlled scale solution holding tank 200 which comprises the fluid level sensor 201, the heating element 202, the tank temperature sensor 203, the air vent 205, the drain gate valve 209, the removable lid 206, the drain pipe 212, the scale solution fluid inlet 200a, the scale solution fluid outlet 200b, the return fluid inlet 200c, and the second piping system 14 including the gate valve 208 and the solenoid valve 211 connected between the homogenizer 115 and the scale solution fluid inlet 200a.

In an aspect, the scale assessment system 20 includes a scale deposit assessment flow loop 300 which comprises the third piping system 16 including the gate valve 309 connected to the scale solution fluid outlet 200b, the solenoid valve 301 connected to the gate valve 309, the high-pressure variable flow scale solution pump 302 connected to the solenoid valve 301, the pressure regulator 303 connected to the high-pressure variable flow scale solution pump 302, the one-way valve 304 connected to the pressure regulator 303, the scale solution flow meter 305, the scale solution pressure sensor 307, the scale solution temperature sensor 306, the plurality of connected U-shaped test pipes 401 connected to the third piping system 16, wherein the plurality of connected U-shaped test pipes 401 include the inlet pipe 400a and the outlet pipe 400b, the differential pressure sensor 308 configured to measure the pressure difference in the flow rate of the scale solution between the inlet pipe 400a and the outlet pipe 400b of the plurality of U-shaped test pipes 401, the plurality of ultrasonic sensors 402-404 connected to the outer surface of each of the U-shaped test pipes 401, wherein each ultrasonic sensor 402-404 is configured to measure the thickness of the scale deposit on the interior surface of the respective U-shaped test pipe 401, and the scale solution return path 405 connected to the return fluid inlet 200c.

In an aspect, the scale is a calcium sulfate deposit on inner walls of the connected U-shaped test pipes 401.

In an aspect, the scale assessment system 20 includes the scale inhibitor flow loop 500 which comprises a scale inhibitor tank 501 configured to hold a scale inhibitor solution, and a fourth piping system 18 including a gate valve 502 connected to an outlet 501a of the scale inhibitor tank 501, a fixed rate scale inhibitor pump 503, a scale inhibitor flow meter 504, a one-way valve 505, and a solenoid valve 506 connected in series, wherein the solenoid valve 506 is connected to the third piping system 16.

In an aspect, the scale assessment system 20 includes the measurement and control unit 30 which comprises a data acquisition system 32, a programmable logic controller 34, and a flow controller 36.

In an aspect, the data acquisition system 32 comprises a microprocessor having a memory including program instructions and at least one processor configured to execute the program instructions to receive data signals from the first salt solution flow meter 107 and the second salt solution flow meter 108 of the first piping system 12, the fluid level sensor 201 and the tank temperature sensor 203 of the insulated temperature controlled scale solution holding tank 200, the scale solution flow meter 305, the scale solution temperature sensor 306, the scale solution pressure sensor 307, the differential pressure sensor 308 and the ultrasonic sensors 402-404 of the third piping system 16 and the scale inhibitor flow meter 504 of the fourth piping system 18, transmit the data signals of the first salt solution flow meter 107, the second salt solution flow meter 108, the scale solution flow meter 305 and the scale inhibitor flow meter 504 to the flow controller 36, and transmit the data signals of the fluid level sensor 201 and the tank temperature sensor 203 of the insulated temperature controlled scale solution holding tank 200, the scale solution temperature sensor 306, the scale solution pressure sensor 307, the differential pressure sensor 308 and the ultrasonic sensors 402-404 of the third piping system 16 to the programmable logic controller 34.

In an aspect, the flow controller 36 is operatively connected to receive the data signals of the first salt solution flow meter 107, the second salt solution flow meter 108, the scale solution flow meter 305 and the scale inhibitor flow meter 504 from the data acquisition system 32, and generate control signals which operate the first variable flow salt solution pump 105 and the second variable flow salt solution pump 106 of the first piping system 12, the high-pressure variable flow scale solution pump 302 of the third piping system 16 and the fixed rate scale inhibitor pump 503 of the fourth piping system 18.

In an aspect, the programmable logic controller 34 is operatively connected to the data acquisition system 32 and the flow controller 36, wherein the programmable logic controller 34 is configured to receive the control signals from the flow controller 36, the data signals of the fluid level sensor 201 and the tank temperature sensor 203 of the insulated temperature controlled scale solution holding tank 200, the scale solution temperature sensor 306, the scale solution pressure sensor 307, the differential pressure sensor 308 and the ultrasonic sensors 402-404 of the third piping system 16 and generate ON/OFF signals which actuate the first variable flow salt solution pump 105, the second variable flow salt solution pump 106, the high-pressure variable flow scale solution pump 302, the pressure regulator 303, the plurality of solenoid valves 109-112, 211, 301 and the heating element 202.

In an aspect, the scale assessment system 20 includes a user interface 38 having the plurality of selectable scale deposit assessment options including the scale deposit assessment option without scale inhibitor solution and the scale deposit assessment option with scale inhibitor solution, wherein the user interface 38 is connected to the programmable logic controller 34, wherein the programmable logic controller 34 is configured to receive the scale deposit assessment option and generate the ON/OFF signals which actuate the first variable flow salt solution pump 105, the second variable flow salt solution pump 106, the high-pressure variable flow scale solution pump 302, the fixed rate scale inhibitor pump 503, the pressure regulator 303, the plurality of solenoid valves 109-112, 211, 301 and the heating element 202 to perform the selected scale deposit assessment option.

The processor of the microprocessor is further configured to execute the program instructions to determine the amount of scale deposited on the U-shaped test pipes 401 from the data signals of the ultrasonic sensors 402-404 and the data signals of the differential pressure sensor 308, when the scale deposit assessment option without scale inhibitor solution is selected generate the data assessment of the amount of scale deposited on the U-shaped test pipes 401 based on the preset flow ratio of the first salt solution and the second salt solution, and when the scale deposit assessment option with scale inhibitor solution is selected generate the data assessment of the amount of scale deposited on the U-shaped test pipes 401 based on the preset flow ratio of the first salt solution and the second salt solution and the amount of scale inhibitor solution mixed with the scale solution.

The microprocessor further includes the display screen, wherein the microprocessor is configured to display the data assessment, the flow rates of the first salt solution and the second salt solution, the flow rate of the scale solution, the flow rate of the scale inhibitor solution and the fluid level in the insulated temperature controlled scale solution holding tank 200 on the display screen.

The flow controller 36 is configured to control the first variable flow salt solution pump 105 and the second variable flow salt solution pump 106 to modify the ratio of the first salt solution and the second salt solution pumped to the homogenizer 115 based on the selected scale deposit assessment.

In an aspect, the scale deposit is one of the calcium sulfate deposit, the barium sulfate deposit, the strontium sulfate deposit, the calcium carbonate deposit, the magnesium carbonate deposit, the iron carbonate deposit, the iron oxide deposit, the magnesium oxide deposit, the magnesium hydroxide deposit, and the iron sulfide deposit, wherein the scale is located on inner walls of the connected U-shaped test pipes 401.

A second embodiment describes a method 50 for performing a scale deposit assessment, comprising selecting, on a user interface 38 of a programmable logic controller 34, a scale deposit assessment option including a first option of a scale deposit solution without a scale inhibitor solution and a second option of a scale deposit solution with a scale inhibitor solution, when the first option is selected generating, by the programmable logic controller 34, a first set of ON/OFF signals which actuate a first variable flow salt solution pump 105 and a second variable flow salt solution pump 106 to pump a first salt solution and a second salt solution through a first piping system 12 respectively at a preset flow ratio to a homogenizer 115, mixing, by the homogenizer 115, the first salt solution and the second salt solution to form a scale solution, generating, by the programmable logic controller 34, a second set of ON/OFF signals which open a solenoid valve 211 to inject the salt solution through a second piping system 14 into an insulated temperature controlled scale solution holding tank 200, generating, by the programmable logic controller 34, a third set of ON/OFF signals which actuate a pressure regulator 303, a tank temperature sensor 203 and a heating element 202 in the insulated temperature controlled scale solution holding tank 200, generating, by the programmable logic controller 34, a fourth set of ON/OFF signals which actuate a high-pressure variable flow scale solution pump 302 to pump the scale solution from a scale solution fluid outlet 200b of the insulated temperature controlled scale solution holding tank 200 through a third piping system 16 into a scale deposit assessment flow loop 300, wherein the scale deposit assessment flow loop 300 includes a plurality of U-shaped test pipes 401 and a plurality of ultrasonic sensors 402-404 connected to an outer surface of each of the U-shaped test pipes 401, and a differential pressure sensor 308 operatively connected to measure a pressure difference in the flow rate between an inlet of the plurality of U-shaped test pipes 401 and an outlet of the U-shaped test pipes 401, receiving, by a microprocessor of a data acquisition system 32, data signals from a first salt solution flow meter 107 and a second salt solution flow meter 108 of the first piping system 12, a fluid level sensor 201 and the tank temperature sensor 203 of the insulated temperature controlled scale solution holding tank 200, a scale solution flow meter 305, a scale solution temperature sensor 306, a scale solution pressure sensor 307, the differential pressure sensor 308 and the ultrasonic sensors 402-404 of the third piping system 16, transmitting, by the microprocessor, the data signals of the first salt solution flow meter 107, the second salt solution flow meter 108, the scale solution flow meter 305 to a flow controller 36, transmitting, by the microprocessor, the data signals of the fluid level sensor 201 and the tank temperature sensor 203 of the insulated temperature controlled scale solution holding tank 200, the scale solution temperature sensor 306, the scale solution pressure sensor 307, the differential pressure sensor 308 and the ultrasonic sensors 402-404 of the third piping system 16 to the programmable logic controller 34, determining, by the microprocessor, an amount of scale deposited on the U-shaped test pipes 401 from the data signals of the ultrasonic sensors 402-404 and the data signals of the differential pressure sensor 308, generating, by the microprocessor, a data assessment of the amount of scale deposited on the U-shaped test pipes 401 due to the preset flow ratio of the first salt solution and the second salt solution, displaying, by the microprocessor, the data assessment, the flow rates of the first salt solution and the second salt solution, a flow rate of the scale solution and the fluid level in the insulated temperature controlled scale solution holding tank 200 on a display screen.

The method further comprises, when the second option is selected, generating, by the programmable logic controller 34, a fifth set of ON/OFF signals which open a solenoid valve 506 of a fourth piping system 18 and actuate a fixed rate scale inhibitor pump 503 to pump a scale inhibitor solution from a scale inhibitor tank 501 through the fourth piping system 18 into the third piping system 16 to mix with the scale solution, receiving, by the microprocessor, data signals from a scale inhibitor flow meter 504 of the fourth piping system 18, transmitting, by the microprocessor, the data signals of the scale inhibitor flow meter 504 to the flow controller 36, controlling, by the flow controller 36, the fixed rate scale inhibitor pump 503 based on the data signal of the scale inhibitor flow meter 504, determining, by the microprocessor, the amount of scale deposited on the U-shaped test pipes 401 from the data signals of the ultrasonic sensors 402-404 and the data signals of the differential pressure sensor 308, generating, by the microprocessor, a data assessment of the amount of scale deposited on the U-shaped test pipes 401 due to the amount of scale inhibitor mixed with the scale solution, determining, by the microprocessor, the effectiveness of the amount of scale inhibitor in decreasing the amount of scale deposited on the U-shaped test pipes 401, and displaying, by the microprocessor, the data assessment of the amount of scale deposited on the U-shaped test pipes 401 due to the amount of scale inhibitor mixed with the scale solution and the effectiveness of the amount of scale inhibitor in decreasing the amount of scale deposited on the U-shaped test pipes 401 on the display screen.

The method further comprises selecting, on the user interface 38, a new preset ratio of the ratio of the first salt solution and the second salt solution based on the data assessment of the selected option, controlling, by the flow controller 36, the first variable flow salt solution pump 105 and the second variable flow salt solution pump 106 to modify the ratio of the first salt solution and the second salt solution pumped to the homogenizer 115 based on new preset ratio.

The method further comprises modifying, by the programmable logic controller 34, the first set of ON/OFF signals, the second set of ON/OFF signals, the third set of ON/OFF signals, the fourth set of ON/OFF signals and the fifth set of ON/OFF signals based on the data assessment of the selected option.

Next, further details of the hardware description of the computing environment according to exemplary embodiments is described with reference to FIG. 6. In FIG. 6, a controller 600 is described embodying the microprocessor of the data acquisition system 32 in which the controller 600 is a computing device which includes a CPU 601 which performs the processes described above/below. The process data and instructions may be stored in memory 602. These processes and instructions may also be stored on a storage medium disk 604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 601, 603 and an operating system such as Microsoft Windows 7, Microsoft Windows 8, Microsoft Windows 10, UNIX, Solaris, LINUX, Apple MAC-OS, and other systems known to those skilled in the art.

The hardware elements in order to achieve the computing device may be realized by various circuitry elements, known to those skilled in the art. For example, CPU 601 or CPU 603 may be a Xenon or Core processor from Intel of America or an Opteron processor from AMD of America or may be other processor types that would be recognized by one of ordinary skill in the art. Alternatively, the CPU 601, 603 may be implemented on an FPGA, ASIC, PLD or using discrete logic circuits, as one of ordinary skill in the art would recognize. Further, CPU 601, 603 may be implemented as multiple processors cooperatively working in parallel to perform the instructions of the inventive processes described above.

The computing device in FIG. 6 also includes a network controller 606, such as an Intel Ethernet PRO network interface card from Intel Corporation of America, for interfacing with network 660. As can be appreciated, the network 660 can be a public network, such as the Internet, or a private network such as an LAN or WAN network, or any combination thereof and can also include PSTN or ISDN subnetworks. The network 660 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computing device such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the computing device. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 7.

Figure 7:
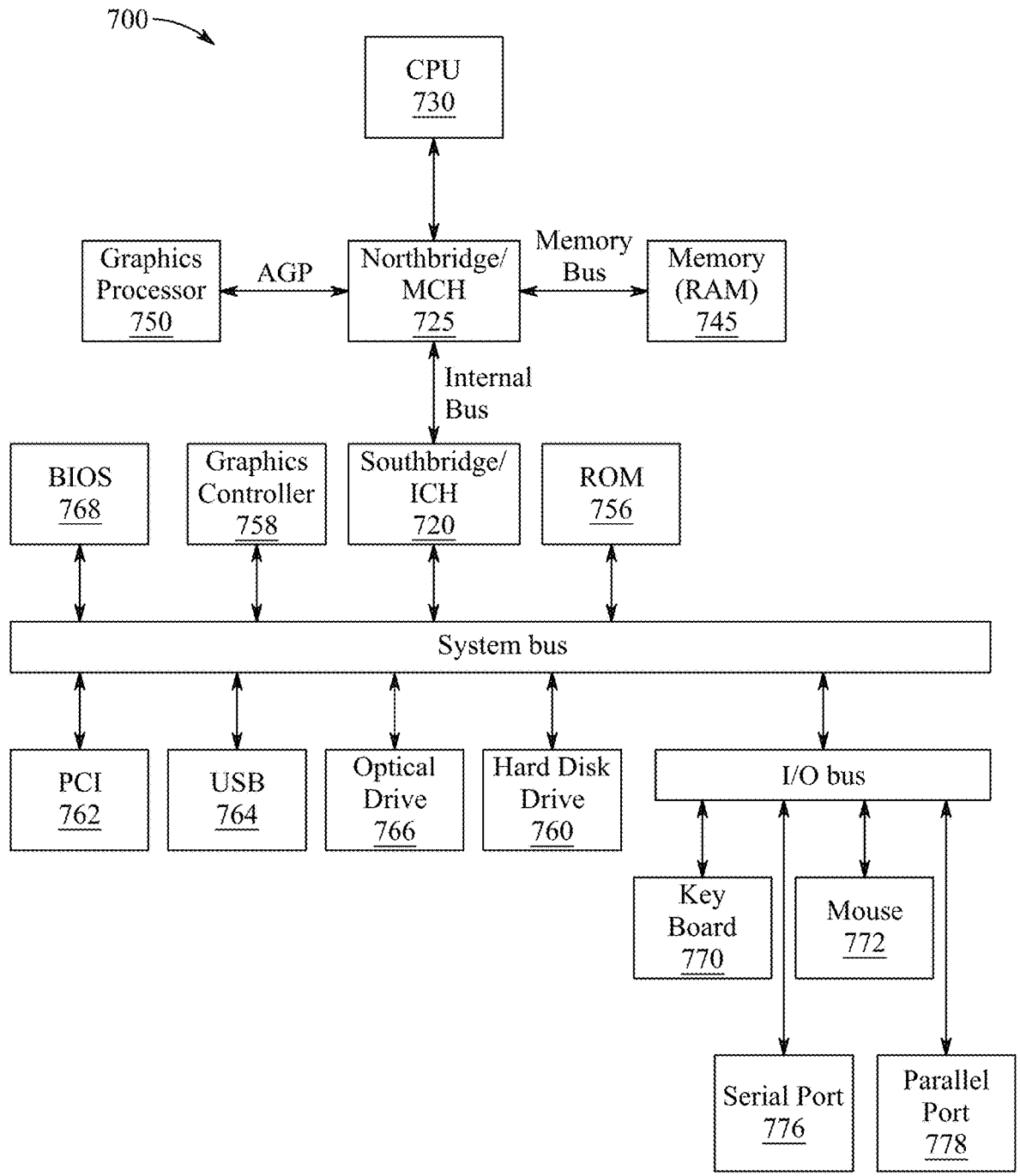
FIG. 7 is an exemplary schematic diagram of a data processing system used within the computing system, according to certain embodiments.

FIG. 7 shows a schematic diagram of a data processing system, according to certain embodiments, for performing the functions of the exemplary embodiments. The data processing system is an example of a computer in which code or instructions implementing the processes of the illustrative embodiments may be located.

In FIG. 7, data processing system 700 employs a hub architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus, and connects to the graphics processor 750 via an accelerated graphics port (AGP). The NB/MCH 725 also connects to the SB/ICH 720 via an internal bus (e.g., a unified media interface or a direct media interface). The CPU Processing unit 730 may contain one or more processors and even may be implemented using one or more heterogeneous processor systems.

Figure 8:
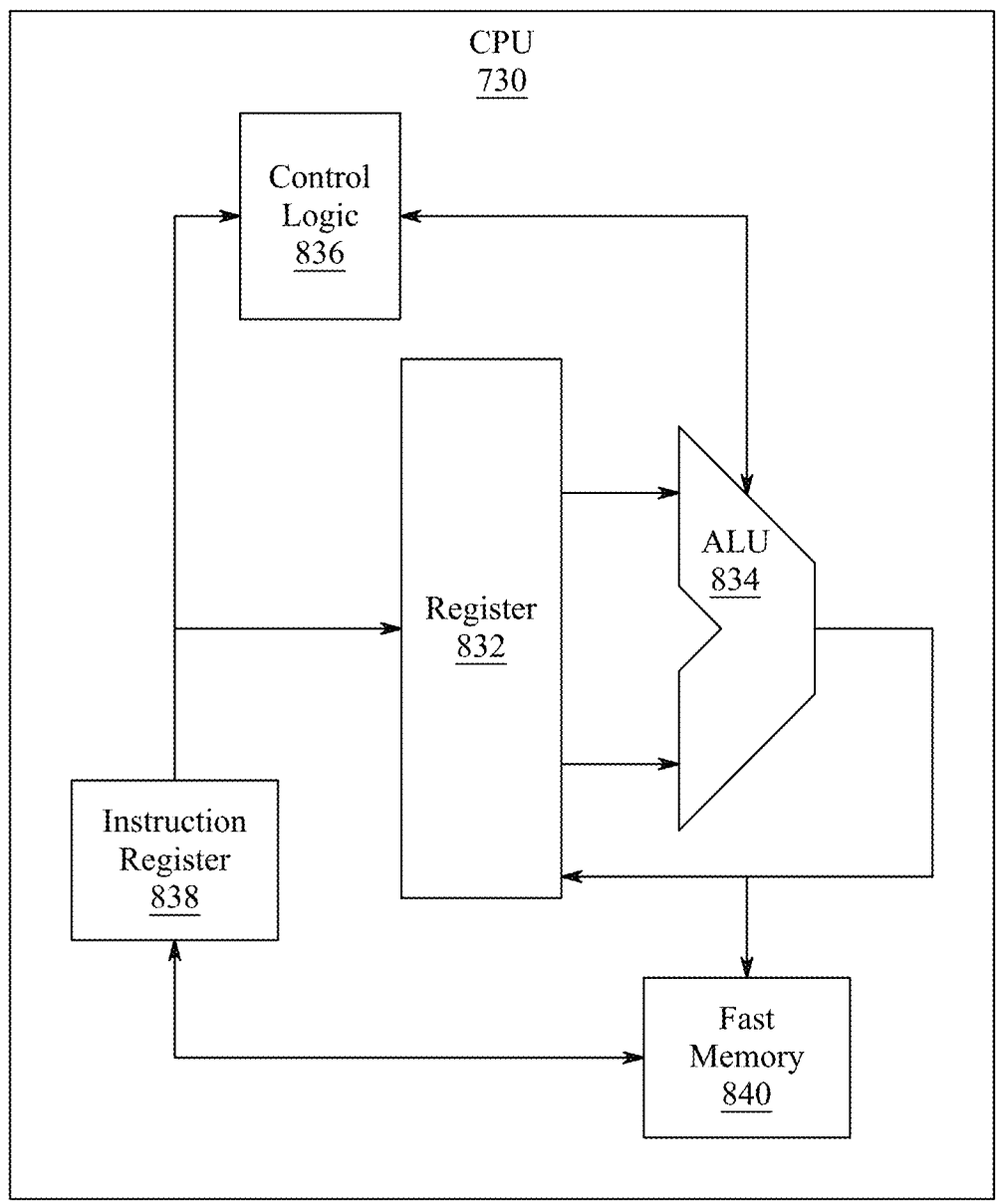
FIG. 8 is an exemplary schematic diagram of a processor used with the computing system, according to certain embodiments.

For example, FIG. 8 shows one implementation of CPU 730. In one implementation, the instruction register 838 retrieves instructions from the fast memory 840. At least part of these instructions are fetched from the instruction register 838 by the control logic 836 and interpreted according to the instruction set architecture of the CPU 730. Part of the instructions can also be directed to the register 832. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations can be feedback into the register and/or stored in the fast memory 840. According to certain implementations, the instruction set architecture of the CPU 730 can use a reduced instruction set architecture, a complex instruction set architecture, a vector processor architecture, a very large instruction word architecture. Furthermore, the CPU 730 can be based on the Von Neuman model or the Harvard model. The CPU 730 can be a digital signal processor, an FPGA, an ASIC, a PLA, a PLD, or a CPLD. Further, the CPU 730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 can include that the SB/ICH 720 is coupled through a system bus to an I/O Bus, a read only memory (ROM) 756, universal serial bus (USB) port 764, a flash binary input/output system (BIOS) 768, and a graphics controller 758. PCI/PCIe devices can also be coupled to SB/ICH 788 through a PCI bus 762.

The PCI devices may include, for example, Ethernet adapters, add-in cards, and PC cards for notebook computers. The Hard disk drive 760 and CD-ROM 766 can use, for example, an integrated drive electronics (IDE) or serial advanced technology attachment (SATA) interface. In one implementation the I/O bus can include a super I/O (SIO) device.

Further, the hard disk drive (HDD) 760 and optical drive 766 can also be coupled to the SB/ICH 720 through a system bus. In one implementation, a keyboard 770, a mouse 772, a parallel port 778, and a serial port 776 can be connected to the system bus through the I/O bus. Other peripherals and devices that can be connected to the SB/ICH 720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 9:
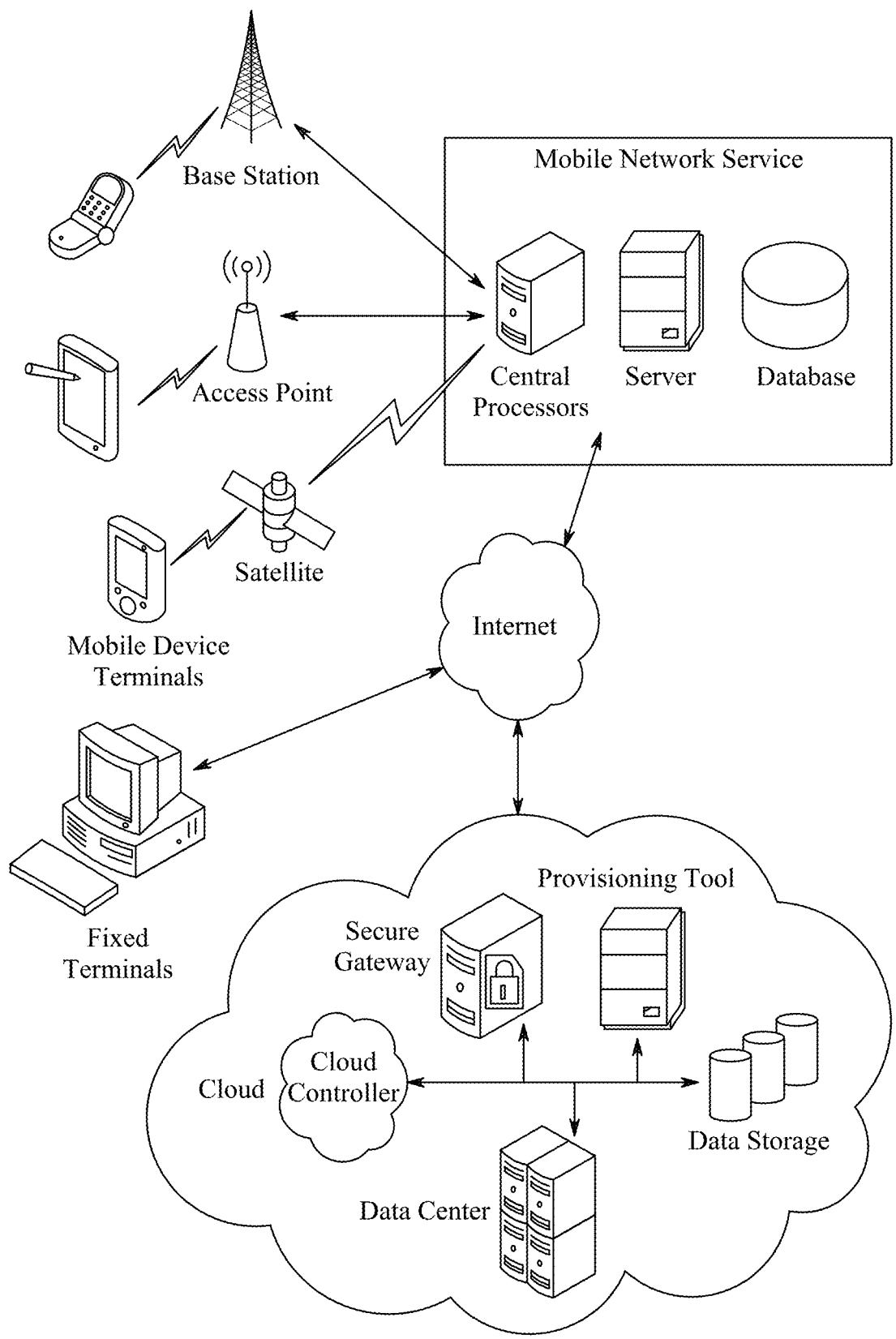
FIG. 9 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 9, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 9, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:
1. A scale assessment system, comprising:
   a scale solution flow loop, comprising:
      a first salt solution tank,
      a second salt solution tank,
      a first piping system having a first flow path connected to the first salt solution tank, and
      a homogenizer connected to the first piping system, wherein the homogenizer is configured to receive the first salt solution and the second salt solution and mix the first salt solution and the second salt solution to form the scale solution;

an insulated temperature controlled scale solution holding tank;

a scale deposit assessment flow loop, comprising:
- a third piping system including:
  - a gate valve connected to the scale solution fluid outlet,
  - a solenoid valve connected to the gate valve,
  - a high-pressure variable flow scale solution pump connected to the solenoid valve,
  - a pressure regulator connected to the high-pressure variable flow scale solution pump,
  - a one-way valve connected to the pressure regulator,
  - a scale solution flow meter,
  - a scale solution pressure sensor,
  - a scale solution temperature sensor, and
  - a differential pressure sensor;
- a plurality of ultrasonic sensors connected to an outer surface of each of the U-shaped test pipes; and
- a scale solution return path connected to the return fluid inlet;

a scale inhibitor flow loop, comprising:
- a scale inhibitor tank configured to hold a scale inhibitor solution; and
- a fourth piping system including a gate valve connected to an outlet of the scale inhibitor tank, a fixed rate scale inhibitor pump, a scale inhibitor flow meter, a one-way valve, and a solenoid valve connected in series; and a measurement and control unit configured to determine one of an amount of scale deposit in a plurality of connected U-shaped test pipes and an amount of scale inhibitor required to prevent scale deposit in the plurality of connected U-shaped test pipes, wherein the plurality of connected U-shaped test pipes is connected to the third piping system.

2. The scale assessment system of claim 1,
wherein the first flow path includes a first variable flow salt solution pump and a first salt solution flow meter and a second flow path connected to the second salt solution tank, wherein the second flow path includes a second variable flow salt solution pump and a second salt solution flow meter, wherein the first piping system further includes a plurality of solenoid valves, a plurality of one-way valves and a plurality of gate valves.

3. The scale assessment system of claim 2, wherein:
the first salt solution tank is configured to hold a mixture of calcium chloride and water; and
the second salt solution tank is configured to hold a mixture of sodium sulfate and water,
wherein the scale solution comprises calcium sulfate.

4. The scale assessment system of claim 2, wherein the insulated temperature controlled scale solution holding tank comprises:
- a fluid level sensor;
- a heating element;
- a tank temperature sensor;
- an air vent;
- a drain gate valve;
- a removable lid;
- a drain pipe;
- a scale solution fluid inlet;
- a scale solution fluid outlet;
- a return fluid inlet; and
- a second piping system including a gate valve and a solenoid valve connected between the homogenizer and the scale solution fluid inlet.

5. The scale assessment system of claim 4,
wherein the plurality of connected U-shaped test pipes include an inlet pipe and an outlet pipe;
wherein the differential pressure sensor is configured to measure a pressure difference in a flow rate of the scale solution between the inlet pipe and the outlet pipe of the plurality of U-shaped test pipes; and
wherein each ultrasonic sensor is configured to measure a thickness of a scale deposit on an interior surface of a respective U-shaped test pipe.

6. The scale assessment system of claim 5, wherein the scale is a calcium sulfate deposit on inner walls of the connected U-shaped test pipes.

7. The scale assessment system of claim 5,
wherein the solenoid valve is connected to the third piping system.

8. The scale assessment system of claim 7, wherein the measurement and control unit comprises:
- a data acquisition system;
- a programmable logic controller; and
- a flow controller.

9. The scale assessment system of claim 8, wherein the data acquisition system comprises:
- a microprocessor having a memory including program instructions and at least one processor configured to execute the program instructions to:
  - receive data signals from the first salt solution flow meter and the second salt solution flow meter of the first piping system, the fluid level sensor and the tank temperature sensor of the insulated temperature controlled scale solution holding tank, the scale solution flow meter, the scale solution temperature sensor, the scale solution pressure sensor, the differential pressure sensor and the ultrasonic sensors of the third piping system and the scale inhibitor flow meter of the fourth piping system;
  - transmit the data signals of the first salt solution flow meter, the second salt solution flow meter, the scale solution flow meter and the scale inhibitor flow meter to the flow controller; and
  - transmit the data signals of the fluid level sensor and the tank temperature sensor of the insulated temperature controlled scale solution holding tank, the scale solution temperature sensor, the scale solution pressure sensor, the differential pressure sensor and the ultrasonic sensors of the third piping system to the programmable logic controller.

10. The scale assessment system of claim 9, wherein the flow controller is operatively connected to receive the data signals of the first salt solution flow meter, the second salt solution flow meter, the scale solution flow meter and the scale inhibitor flow meter from the data acquisition system, and generate control signals which operate the first variable flow salt solution pump and the second variable flow salt solution pump of the first piping system, the high-pressure variable flow scale solution pump of the third piping system and the fixed rate scale inhibitor pump of the fourth piping system.

11. The scale assessment system of claim 10, wherein the programmable logic controller is operatively connected to the data acquisition system and the flow controller, wherein the programmable logic controller is configured to receive the control signals from the flow controller, the data signals of the fluid level sensor and the tank temperature sensor of the insulated temperature controlled scale solution holding tank, the scale solution temperature sensor, the scale solution pressure sensor, the differential pressure sensor and the ultrasonic sensors of the third piping system and generate ON/OFF signals which actuate the first variable flow salt solution pump, the second variable flow salt solution pump, the high-pressure variable flow scale solution pump, the pressure regulator, the plurality of solenoid valves and the heating element.

12. The scale assessment system of claim 11, further comprising:
a user interface having a plurality of selectable scale deposit assessment options including a scale deposit assessment option without scale inhibitor solution and a scale deposit assessment option with scale inhibitor solution,
wherein the user interface is connected to the programmable logic controller,
wherein the programmable logic controller is configured to receive a scale deposit assessment option and generate the ON/OFF signals which actuate the first variable flow salt solution pump, the second variable flow salt solution pump, the high-pressure variable flow scale solution pump, the fixed rate scale inhibitor pump, the pressure regulator, the plurality of solenoid valves and the heating element to perform the selected scale deposit assessment option.

13. The scale assessment system of claim 12, wherein the processor of the microprocessor is further configured to execute the program instructions to:
determine an amount of scale deposited on the U-shaped test pipes from the data signals of the ultrasonic sensors and the data signals of the differential pressure sensor;
when the scale deposit assessment option without scale inhibitor solution is selected:
generate a data assessment of the amount of scale deposited on the U-shaped test pipes based on the preset flow ratio of the first salt solution and the second salt solution; and
when the scale deposit assessment option with scale inhibitor solution is selected:
generate a data assessment of the amount of scale deposited on the U-shaped test pipes based on the preset flow ratio of the first salt solution and the second salt solution and the amount of scale inhibitor solution mixed with the scale solution.

14. The scale assessment system of claim 13, wherein the microprocessor further includes a display screen, wherein the microprocessor is configured to display the data assessment, the flow rates of the first salt solution and the second salt solution, a flow rate of the scale solution, a flow rate of the scale inhibitor solution and the fluid level in the insulated temperature controlled scale solution holding tank on the display screen.

15. The scale assessment system of claim 13, wherein the flow controller is configured to control the first variable flow salt solution pump and the second variable flow salt solution pump to modify a ratio of the first salt solution and the second salt solution pumped to the homogenizer based on the selected scale deposit assessment.

16. The scale assessment system of claim 1, wherein the scale deposit is one of a calcium sulfate deposit, a barium sulfate deposit, a strontium sulfate deposit, a calcium carbonate deposit, a magnesium carbonate deposit, an iron carbonate deposit, an iron oxide deposit, a magnesium oxide deposit, a magnesium hydroxide deposit, and an iron sulfide deposit, wherein the scale is located on inner walls of the connected U-shaped test pipes.

\* \* \* \* \*